(12) United States Patent  
Wagner et al.

(10) Patent No.: US 9,928,108 B1
(45) Date of Patent: Mar. 27, 2018

(54) METAEVENT HANDLING FOR ON-DEMAND CODE EXECUTION ENVIRONMENTS

(71) Applicant: Amazon Technologies, Inc., Seattle, WA (US)

(72) Inventors: Timothy Allen Wagner, Seattle, WA (US); Scott Daniel Wisniewski, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 181 days.

(21) Appl. No.: 14/869,801

(22) Filed: Sep. 29, 2015

(51) Int. Cl.
| | |
|---|---|
| G06F 9/455 | (2006.01) |
| G06F 9/48 | (2006.01) |
| G06F 9/46 | (2006.01) |

(52) U.S. Cl.
CPC ............ *G06F 9/4856* (2013.01); *G06F 9/466* (2013.01)

(58) Field of Classification Search
None
See application file for complete search history.

(56) References Cited

U.S. PATENT DOCUMENTS

| | | |
|---|---|---|
| 5,283,888 A | 2/1994 | Dao et al. |
| 5,970,488 A | 10/1999 | Crowe et al. |
| 6,708,276 B1 | 3/2004 | Yarsa et al. |
| 7,036,121 B1 | 4/2006 | Casabona et al. |

(Continued)

FOREIGN PATENT DOCUMENTS

| | | |
|---|---|---|
| EP | 2663052 A1 | 11/2013 |
| WO | WO 2009/137567 A1 | 11/2009 |

(Continued)

OTHER PUBLICATIONS

Espadas et al. "A tenant-based resource allocation model for scaling Software-as-a-Service applications over cloud computing infrastructures." Future Generation Computer Systems 29.1 (2013): 273-286.Retrieved on [Apr. 21, 2016] Retrieved from the Internet: URLhttp://www.sciencedirect.com/science/articie/pii/S0167739X1100210X.

(Continued)

*Primary Examiner* — Hiren Patel
(74) *Attorney, Agent, or Firm* — Knobbe, Martens, Olson & Bear, LLP

(57) ABSTRACT

Systems and methods are described for generating and executing metaevents within an on-demand code execution environment. The code execution environment can include virtual machine instances that are pre-initialized to enable low latency execution of arbitrary user-defined code. Code execution can typically occur in response to a defined event trigger, such as a call to an application programming interface (API) from an external source. Code execution may also occur in response to metadata regarding the operation of the code execution environment. A user may specify criteria for "metaevents" based on the metadata, and also specify code to be executed in response to satisfaction of the criteria. When the code execution environment determines that the user's criteria is satisfied, a metaevent may be generated that causes execution of the set of code. This execution may, in turn, generate metadata that triggers one or more metaevents.

18 Claims, 7 Drawing Sheets

(56) References Cited

U.S. PATENT DOCUMENTS

| | | |
|---|---|---|
| 7,665,090 B1 | 2/2010 | Tormasov et al. |
| 7,707,579 B2 | 4/2010 | Rodriguez |
| 7,730,464 B2 | 6/2010 | Trowbridge |
| 7,774,191 B2 | 8/2010 | Berkowitz et al. |
| 7,823,186 B2 | 10/2010 | Pouliot |
| 7,886,021 B2 | 2/2011 | Scheifler et al. |
| 8,010,990 B2 | 8/2011 | Ferguson et al. |
| 8,024,564 B2 | 9/2011 | Bassani et al. |
| 8,046,765 B2 | 10/2011 | Cherkasova et al. |
| 8,051,180 B2 | 11/2011 | Mazzaferri et al. |
| 8,051,266 B2 | 11/2011 | DeVal et al. |
| 8,065,676 B1 | 11/2011 | Sahai et al. |
| 8,095,931 B1 | 1/2012 | Chen et al. |
| 8,146,073 B2 | 3/2012 | Sinha |
| 8,166,304 B2 | 4/2012 | Murase et al. |
| 8,171,473 B2 | 5/2012 | Lavin |
| 8,219,987 B1 * | 7/2012 | Vlaovic .............. G06F 9/44 717/148 |
| 8,321,554 B2 | 11/2012 | Dickinson |
| 8,336,079 B2 | 12/2012 | Budko et al. |
| 8,429,282 B1 | 4/2013 | Ahuja |
| 8,448,165 B1 | 5/2013 | Conover |
| 8,613,070 B1 | 12/2013 | Borzycki et al. |
| 8,631,130 B2 | 1/2014 | Jackson |
| 8,694,996 B2 | 4/2014 | Cawlfield et al. |
| 8,719,415 B1 | 5/2014 | Sirota et al. |
| 8,725,702 B1 | 5/2014 | Raman et al. |
| 8,756,696 B1 | 6/2014 | Miller |
| 8,769,519 B2 | 7/2014 | Leitman et al. |
| 8,819,679 B2 | 8/2014 | Agarwal et al. |
| 8,825,964 B1 | 9/2014 | Sopka et al. |
| 8,904,008 B2 | 12/2014 | Calder et al. |
| 8,997,093 B2 | 3/2015 | Dimitrov |
| 9,027,087 B2 | 5/2015 | Ishaya et al. |
| 9,038,068 B2 | 5/2015 | Engle et al. |
| 9,086,897 B2 | 6/2015 | Oh et al. |
| 9,092,837 B2 | 7/2015 | Bala et al. |
| 9,110,732 B1 * | 8/2015 | Forschmiedt ....... G06F 9/44505 |
| 9,112,813 B2 | 8/2015 | Jackson |
| 9,146,764 B1 * | 9/2015 | Wagner .............. G06F 9/45533 |
| 9,183,019 B2 | 11/2015 | Kruglick |
| 9,208,007 B2 | 12/2015 | Harper et al. |
| 9,223,561 B2 | 12/2015 | Orveillon et al. |
| 9,223,966 B1 * | 12/2015 | Satish ................ G06F 21/53 |
| 9,317,689 B2 * | 4/2016 | Aissi ................. G06F 21/30 |
| 9,323,556 B2 | 4/2016 | Wagner |
| 9,361,145 B1 | 6/2016 | Wilson et al. |
| 9,413,626 B2 | 8/2016 | Reque et al. |
| 9,436,555 B2 | 9/2016 | Dornemann et al. |
| 9,461,996 B2 | 10/2016 | Hayton et al. |
| 9,471,775 B1 | 10/2016 | Wagner et al. |
| 9,483,335 B1 | 11/2016 | Wagner et al. |
| 9,489,227 B2 | 11/2016 | Oh et al. |
| 9,537,788 B2 | 1/2017 | Reque et al. |
| 9,588,790 B1 | 3/2017 | Wagner et al. |
| 9,600,312 B2 | 3/2017 | Wagner et al. |
| 9,652,306 B1 * | 5/2017 | Wagner .............. G06F 9/542 |
| 9,652,617 B1 | 5/2017 | Evans et al. |
| 9,661,011 B1 | 5/2017 | Van Horenbeeck et al. |
| 9,678,773 B1 | 6/2017 | Wagner et al. |
| 9,678,778 B1 | 6/2017 | Youseff |
| 9,715,402 B2 | 7/2017 | Wagner et al. |
| 9,727,725 B2 | 8/2017 | Wagner et al. |
| 9,733,967 B2 | 8/2017 | Wagner et al. |
| 9,760,387 B2 * | 9/2017 | Wagner .............. G06F 9/45508 |
| 9,811,363 B1 * | 11/2017 | Wagner .............. G06F 9/45516 |
| 2002/0172273 A1 | 11/2002 | Baker et al. |
| 2003/0071842 A1 * | 4/2003 | King .................. G06F 9/542 715/762 |
| 2003/0084434 A1 | 5/2003 | Ren |
| 2004/0249947 A1 | 12/2004 | Novaes et al. |
| 2004/0268358 A1 | 12/2004 | Darling et al. |
| 2005/0044301 A1 | 2/2005 | Vasilevsky et al. |
| 2005/0132167 A1 | 6/2005 | Longobardi |
| 2005/0132368 A1 | 6/2005 | Sexton et al. |
| 2005/0193113 A1 | 9/2005 | Kokusho et al. |
| 2005/0193283 A1 | 9/2005 | Reinhardt et al. |
| 2005/0257051 A1 | 11/2005 | Richard |
| 2006/0123066 A1 | 6/2006 | Jacobs et al. |
| 2006/0184669 A1 | 8/2006 | Vaidyanathan et al. |
| 2006/0200668 A1 | 9/2006 | Hybre et al. |
| 2006/0212332 A1 * | 9/2006 | Jackson .............. G06F 9/5027 709/226 |
| 2006/0242647 A1 | 10/2006 | Kimbrel et al. |
| 2006/0248195 A1 | 11/2006 | Toumura et al. |
| 2007/0094396 A1 | 4/2007 | Takano et al. |
| 2007/0130341 A1 | 6/2007 | Ma |
| 2007/0255604 A1 | 11/2007 | Seelig |
| 2008/0028409 A1 | 1/2008 | Cherkasova et al. |
| 2008/0082977 A1 | 4/2008 | Araujo et al. |
| 2008/0104247 A1 | 5/2008 | Venkatakrishnan et al. |
| 2008/0104608 A1 | 5/2008 | Hyser et al. |
| 2008/0126110 A1 | 5/2008 | Haeberle et al. |
| 2008/0126486 A1 | 5/2008 | Heist |
| 2008/0189468 A1 | 8/2008 | Schmidt et al. |
| 2008/0201711 A1 | 8/2008 | Husain |
| 2009/0013153 A1 | 1/2009 | Hilton |
| 2009/0025009 A1 | 1/2009 | Brunswig et al. |
| 2009/0055810 A1 | 2/2009 | Kondur |
| 2009/0055829 A1 * | 2/2009 | Gibson ............... G06F 9/4881 718/103 |
| 2009/0077569 A1 | 3/2009 | Appleton et al. |
| 2009/0125902 A1 | 5/2009 | Ghosh et al. |
| 2009/0158275 A1 | 6/2009 | Wang et al. |
| 2009/0193410 A1 | 7/2009 | Arthursson et al. |
| 2009/0198769 A1 | 8/2009 | Keller et al. |
| 2009/0204964 A1 | 8/2009 | Foley et al. |
| 2009/0300599 A1 | 12/2009 | Piotrowski |
| 2010/0023940 A1 | 1/2010 | Iwamatsu et al. |
| 2010/0031274 A1 | 2/2010 | Sim-Tang |
| 2010/0031325 A1 | 2/2010 | Maigne et al. |
| 2010/0070725 A1 | 3/2010 | Prahlad et al. |
| 2010/0114825 A1 * | 5/2010 | Siddegowda .......... G06F 8/71 707/638 |
| 2010/0115098 A1 | 5/2010 | De Baer et al. |
| 2010/0122343 A1 | 5/2010 | Ghosh |
| 2010/0131959 A1 | 5/2010 | Spiers et al. |
| 2010/0186011 A1 | 7/2010 | Magenheimer |
| 2010/0198972 A1 | 8/2010 | Umbehocker |
| 2010/0199285 A1 | 8/2010 | Medovich |
| 2010/0257116 A1 | 10/2010 | Mehta et al. |
| 2010/0269109 A1 | 10/2010 | Cartales |
| 2011/0029970 A1 | 2/2011 | Arasaratnam |
| 2011/0055378 A1 | 3/2011 | Ferris et al. |
| 2011/0055396 A1 | 3/2011 | DeHaan |
| 2011/0099551 A1 | 4/2011 | Fahrig et al. |
| 2011/0134761 A1 | 6/2011 | Smith |
| 2011/0141124 A1 | 6/2011 | Halls et al. |
| 2011/0153838 A1 | 6/2011 | Belkine et al. |
| 2011/0154353 A1 | 6/2011 | Theroux et al. |
| 2011/0184993 A1 | 7/2011 | Chawla et al. |
| 2011/0265164 A1 | 10/2011 | Lucovsky |
| 2011/0314465 A1 | 12/2011 | Smith et al. |
| 2011/0321033 A1 | 12/2011 | Kelkar et al. |
| 2012/0016721 A1 * | 1/2012 | Weinman ............ G06Q 10/06 705/7.35 |
| 2012/0041970 A1 * | 2/2012 | Ghosh ............... G06F 17/30902 707/769 |
| 2012/0054744 A1 | 3/2012 | Singh et al. |
| 2012/0072914 A1 | 3/2012 | Ota |
| 2012/0096468 A1 | 4/2012 | Chakravorty et al. |
| 2012/0102307 A1 | 4/2012 | Wong |
| 2012/0102333 A1 | 4/2012 | Wong |
| 2012/0110155 A1 | 5/2012 | Adlung et al. |
| 2012/0110164 A1 | 5/2012 | Frey et al. |
| 2012/0110588 A1 | 5/2012 | Bieswanger et al. |
| 2012/0131379 A1 | 5/2012 | Tameshige et al. |
| 2012/0192184 A1 | 7/2012 | Burckart et al. |
| 2012/0197958 A1 | 8/2012 | Nightingale et al. |
| 2012/0233464 A1 | 9/2012 | Miller et al. |
| 2012/0331113 A1 * | 12/2012 | Jain ................. G06F 9/5072 709/220 |
| 2013/0014101 A1 | 1/2013 | Ballani et al. |
| 2013/0042234 A1 | 2/2013 | DeLuca et al. |

(56) References Cited

U.S. PATENT DOCUMENTS

| | | |
|---|---|---|
| 2013/0054804 A1 | 2/2013 | Jana et al. |
| 2013/0054927 A1 | 2/2013 | Raj et al. |
| 2013/0055262 A1 | 2/2013 | Lubsey et al. |
| 2013/0061208 A1 | 3/2013 | Tsao et al. |
| 2013/0097601 A1 | 4/2013 | Podvratnik et al. |
| 2013/0111469 A1 | 5/2013 | B et al. |
| 2013/0132942 A1 | 5/2013 | Wang |
| 2013/0139152 A1 | 5/2013 | Chang et al. |
| 2013/0151648 A1 | 6/2013 | Luna |
| 2013/0179574 A1 | 7/2013 | Calder et al. |
| 2013/0179881 A1 | 7/2013 | Calder et al. |
| 2013/0179894 A1 | 7/2013 | Calder et al. |
| 2013/0185729 A1 | 7/2013 | Vasic et al. |
| 2013/0191924 A1 | 7/2013 | Tedesco |
| 2013/0198319 A1 | 8/2013 | Shen et al. |
| 2013/0198743 A1* | 8/2013 | Kruglick .............. G06F 9/45533 718/1 |
| 2013/0205092 A1 | 8/2013 | Roy et al. |
| 2013/0219390 A1 | 8/2013 | Lee et al. |
| 2013/0227641 A1 | 8/2013 | White et al. |
| 2013/0232480 A1 | 9/2013 | Winterfeldt et al. |
| 2013/0239125 A1* | 9/2013 | Iorio ...................... G06F 9/466 719/318 |
| 2013/0263117 A1 | 10/2013 | Konik et al. |
| 2013/0297964 A1 | 11/2013 | Hegdal et al. |
| 2013/0339950 A1 | 12/2013 | Ramarathinam et al. |
| 2013/0346946 A1 | 12/2013 | Pinnix |
| 2013/0346964 A1 | 12/2013 | Nobuoka et al. |
| 2013/0346987 A1 | 12/2013 | Raney et al. |
| 2013/0347095 A1 | 12/2013 | Barjatiya et al. |
| 2014/0007097 A1 | 1/2014 | Chin et al. |
| 2014/0019965 A1 | 1/2014 | Neuse et al. |
| 2014/0019966 A1 | 1/2014 | Neuse et al. |
| 2014/0040343 A1 | 2/2014 | Nickolov et al. |
| 2014/0040857 A1 | 2/2014 | Trinchini et al. |
| 2014/0040880 A1 | 2/2014 | Brownlow et al. |
| 2014/0059226 A1 | 2/2014 | Messerli et al. |
| 2014/0068611 A1 | 3/2014 | McGrath et al. |
| 2014/0082165 A1 | 3/2014 | Marr et al. |
| 2014/0101649 A1 | 4/2014 | Kamble et al. |
| 2014/0109087 A1 | 4/2014 | Jujare et al. |
| 2014/0109088 A1 | 4/2014 | Dournov et al. |
| 2014/0129667 A1 | 5/2014 | Ozawa |
| 2014/0130040 A1 | 5/2014 | Lemanski |
| 2014/0173614 A1 | 6/2014 | Konik et al. |
| 2014/0173616 A1 | 6/2014 | Bird et al. |
| 2014/0180862 A1 | 6/2014 | Certain et al. |
| 2014/0189677 A1 | 7/2014 | Curzi et al. |
| 2014/0201735 A1 | 7/2014 | Kannan et al. |
| 2014/0207912 A1 | 7/2014 | Thibeault |
| 2014/0215073 A1 | 7/2014 | Dow et al. |
| 2014/0245297 A1 | 8/2014 | Hackett |
| 2014/0279581 A1 | 9/2014 | Devereaux |
| 2014/0282615 A1 | 9/2014 | Cavage et al. |
| 2014/0289286 A1 | 9/2014 | Gusak |
| 2014/0304698 A1 | 10/2014 | Chigurapati et al. |
| 2014/0380085 A1 | 12/2014 | Rash et al. |
| 2015/0052258 A1 | 2/2015 | Johnson et al. |
| 2015/0074659 A1 | 3/2015 | Madsen et al. |
| 2015/0081885 A1* | 3/2015 | Thomas .............. G06F 9/45558 709/224 |
| 2015/0120928 A1* | 4/2015 | Gummaraju ........ H04L 67/1008 709/226 |
| 2015/0178110 A1 | 6/2015 | Li et al. |
| 2015/0186129 A1 | 7/2015 | Apte et al. |
| 2015/0235144 A1 | 8/2015 | Gusev et al. |
| 2015/0242225 A1* | 8/2015 | Muller ................... G06F 9/542 718/1 |
| 2015/0256621 A1 | 9/2015 | Noda et al. |
| 2015/0261578 A1 | 9/2015 | Greden et al. |
| 2015/0289220 A1 | 10/2015 | Kim et al. |
| 2015/0319160 A1 | 11/2015 | Ferguson et al. |
| 2015/0332048 A1 | 11/2015 | Mooring et al. |
| 2015/0350701 A1 | 12/2015 | Lemus et al. |
| 2015/0363181 A1 | 12/2015 | Alberti et al. |
| 2015/0378764 A1 | 12/2015 | Sivasubramanian et al. |
| 2015/0378765 A1* | 12/2015 | Singh .................. G06F 9/45558 718/1 |
| 2016/0012099 A1 | 1/2016 | Tuatini et al. |
| 2016/0072727 A1 | 3/2016 | Leafe et al. |
| 2016/0092250 A1 | 3/2016 | Wagner et al. |
| 2016/0092252 A1 | 3/2016 | Wagner |
| 2016/0098285 A1* | 4/2016 | Davis .................. G06F 9/45545 718/1 |
| 2016/0224360 A1 | 8/2016 | Wagner et al. |
| 2016/0224785 A1* | 8/2016 | Wagner ................... G06F 21/53 |
| 2016/0239318 A1 | 8/2016 | Wagner |
| 2016/0285906 A1 | 9/2016 | Fine et al. |
| 2016/0294614 A1 | 10/2016 | Searle et al. |
| 2016/0299790 A1 | 10/2016 | Thompson |
| 2016/0301739 A1 | 10/2016 | Thompson |
| 2016/0371127 A1 | 12/2016 | Antony et al. |
| 2017/0090961 A1 | 3/2017 | Wagner et al. |
| 2017/0116051 A1 | 4/2017 | Wagner et al. |
| 2017/0177391 A1 | 6/2017 | Wagner et al. |
| 2017/0177413 A1 | 6/2017 | Wisniewski et al. |
| 2017/0192804 A1 | 7/2017 | Wagner |
| 2017/0199766 A1 | 7/2017 | Wagner et al. |
| 2017/0206116 A1 | 7/2017 | Reque et al. |
| 2017/0286143 A1* | 10/2017 | Wagner ............... G06F 9/45558 |

FOREIGN PATENT DOCUMENTS

| | | |
|---|---|---|
| WO | WO 2016/053950 A1 | 4/2016 |
| WO | WO 2016/053968 A1 | 4/2016 |
| WO | WO 2016/053973 A1 | 4/2016 |
| WO | WO 2016/090292 A1 | 6/2016 |
| WO | WO 2016/126731 A1 | 8/2016 |
| WO | WO 2016/164633 A1 | 10/2016 |
| WO | WO 2016/164638 A1 | 10/2016 |
| WO | WO 2017/112526 A1 | 6/2017 |

OTHER PUBLICATIONS

Vaquero, et al. "Dynamically scaling applications in the cloud." ACM SIGCOMM Computer Communication Review 41.1 (2011): pp. 45-52. Retrieved on [Apr. 21, 2016] Retrieved from the Internet: URL<http://dl.acm.org/citation.cfm?d=1925869>.

International Search Report and Written Opinion in PCT/US2015/052810 dated Dec. 17, 2015, 18 pages.

International Search Report and Written Opinion in PCT/US2015/052838 dated Dec. 18, 2015, 23 pages.

International Search Report and Written Opinion in PCT/US2015/052833 dated Jan. 13, 2016, 17 pages.

International Search Report and Written Opinion in PCT/US2015/064071 dated Mar. 16, 2016, 17 pages.

International Search Report and Written Opinion in PCT/US2016/016211 dated Apr. 13, 2016 11 pages.

Adapter Pattern, Wikipedia, https://en.wikipedia.org/w/index.php?title=Adapter_pattern&oldid=654971255, [retrieved May 26, 2016], 6 pages.

Czajkowski, G., and L. Daynes, Multitasking Without Compromise: A Virtual Machine Evolution 47(4a):60-73, ACM SIGPLAN Notices—Supplemental Issue, Apr. 2012.

Dombrowski, M., et al., Dynamic Monitor Allocation in the Java Virtual Machine, JTRES '13, Oct. 9-11, 2013, pp. 30-37.

Nakajima, J., et al., Optimizing Virtual Machines Using Hybrid Virtualization, SAC '11, Mar. 21-25, 2011, TaiChung, Taiwan, pp. 573-578.

Qian, H. and D. Medhi, et al., Estimating Optimal Cost of Allocating Virtualized Resources With Dynamic Demand, ITC 2011, Sep. 2011, pp. 320-321.

Shim (computing), Wikipedia, https://en.wikipedia.org/w/index.php?title+Shim_(computing)&oldid+654971528, [retrieved on May 26, 2016], 2 pages.

Vaghani, S.B., Virtual Machine File System, ACM SIGOPS Operating Systems Review 44(4):57-70, Dec. 2010.

(56) References Cited

OTHER PUBLICATIONS

Zheng, C., and D. Thain, Integrating Containers into Workflows: A Case Study Using Makeflow, Work Queue, and Docker, VTDC '15, Jun. 15, 2015, Portland, Oregon, pp. 31-38.
International Search Report and Written Opinion in PCT/US2016/026514 dated Jun. 8, 2016.
International Search Report and Written Opinion in PCT/US2016/026520 dated Jul. 5, 2016.
International Search Report and Written Opinion in PCT/US2016/054774 dated Dec. 16, 2016.
Anonymous: "Docker run reference", Dec. 7, 2015, XP055350246, Retrieved from the Internet:URL:https://web.archive.org/web/20151207111702/https:/docs.docker.com/engine/reference/run/[retrieved on Feb. 28, 2017].
Ben-Yehuda et al., "Deconstructing Amazon EC2 Spot Instance Pricing", ACM Transactions on Economics and Computation 1.3, 2013, 15 pages.
Hoffman, Auto scaling your website with Amazon Web Services (AWS)—Part 2, Cardinalpath, Sep. 2015, 15 pages.
International Preliminary Report on Patentability in PCT/US2015/052810 dated Apr. 4, 2017.
International Preliminary Report on Patentability in PCT/US2015/052838 dated Apr. 4, 2017.
International Preliminary Report on Patentability in PCT/US2015/052833 dated Apr. 4, 2017.
International Preliminary Report on Patentability in PCT/US2015/064071 dated Jun. 6, 2017.
International Search Report and Written Opinion in PCT/US2016/066997 dated Mar. 20, 2017.
International Search Report and Written Opinion in PCT/US/2017/023564 dated Jun. 6, 2017.

* cited by examiner

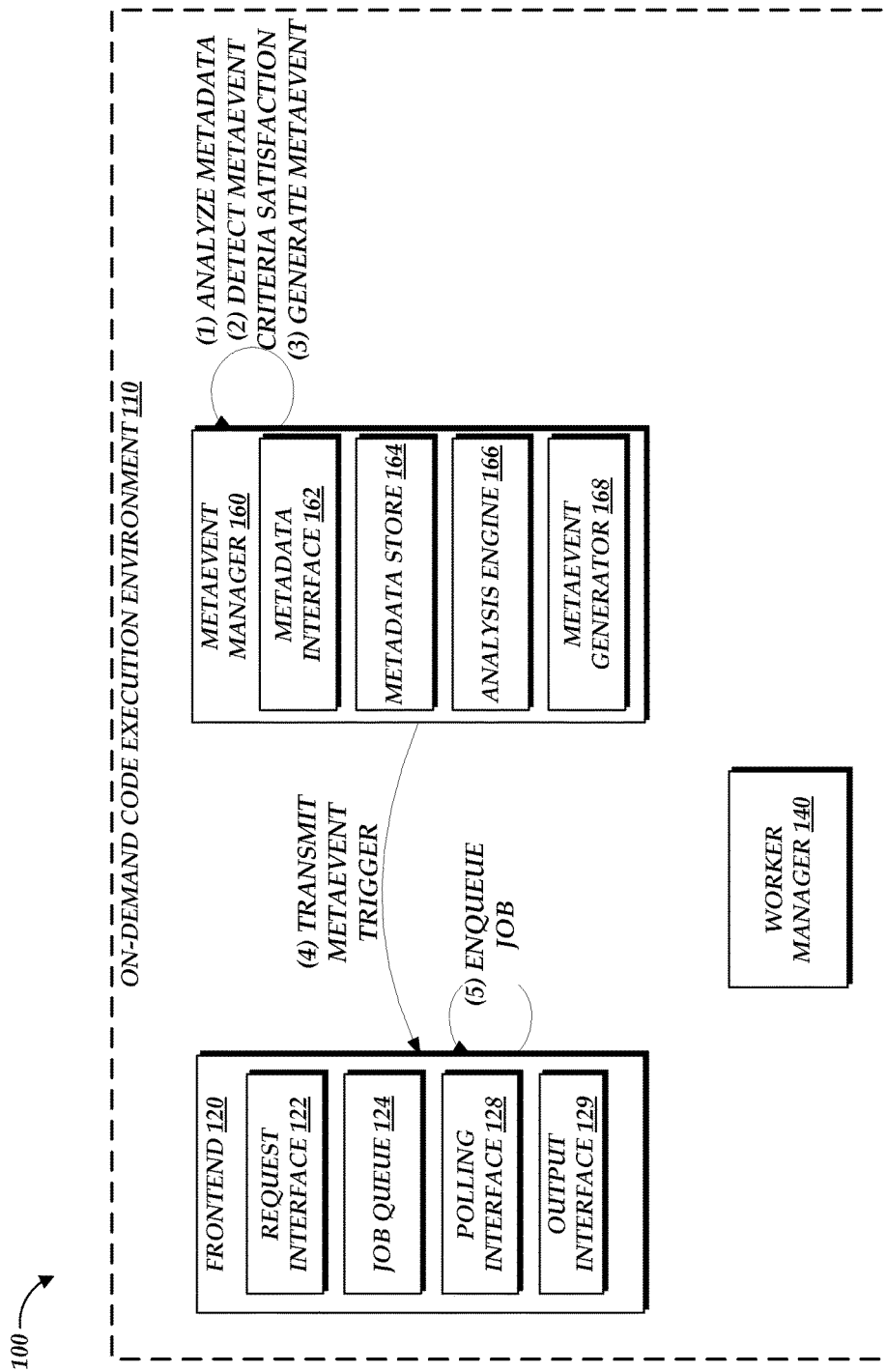

METAEVENT HANDLING FOR ON-DEMAND CODE EXECUTION ENVIRONMENTS

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

In some scenarios, virtual machine instances may be configured according to a number of virtual machine instance types to provide specific functionality. For example, various computing devices may be associated with different combinations of operating systems or operating system configurations, virtualized hardware resources and software applications to enable a computing device to provide different desired functionalities, or to provide similar functionalities more efficiently. These virtual machine instance type configurations are often contained within a device image, which includes static data containing the software (e.g., the OS and applications together with their configuration and data files, etc.) that the virtual machine will run once started. The device image is typically stored on the disk used to create or initialize the instance. Thus, a computing device may process the device image in order to implement the desired software configuration.

BRIEF DESCRIPTION OF DRAWINGS

FIG. 5 is a flow diagram depicting illustrative interactions for analyzing metadata regarding execution of the on-demand code execution environment of FIG. 1 and triggering a metaevent based on the metadata;

DETAILED DESCRIPTION

Figure 1:
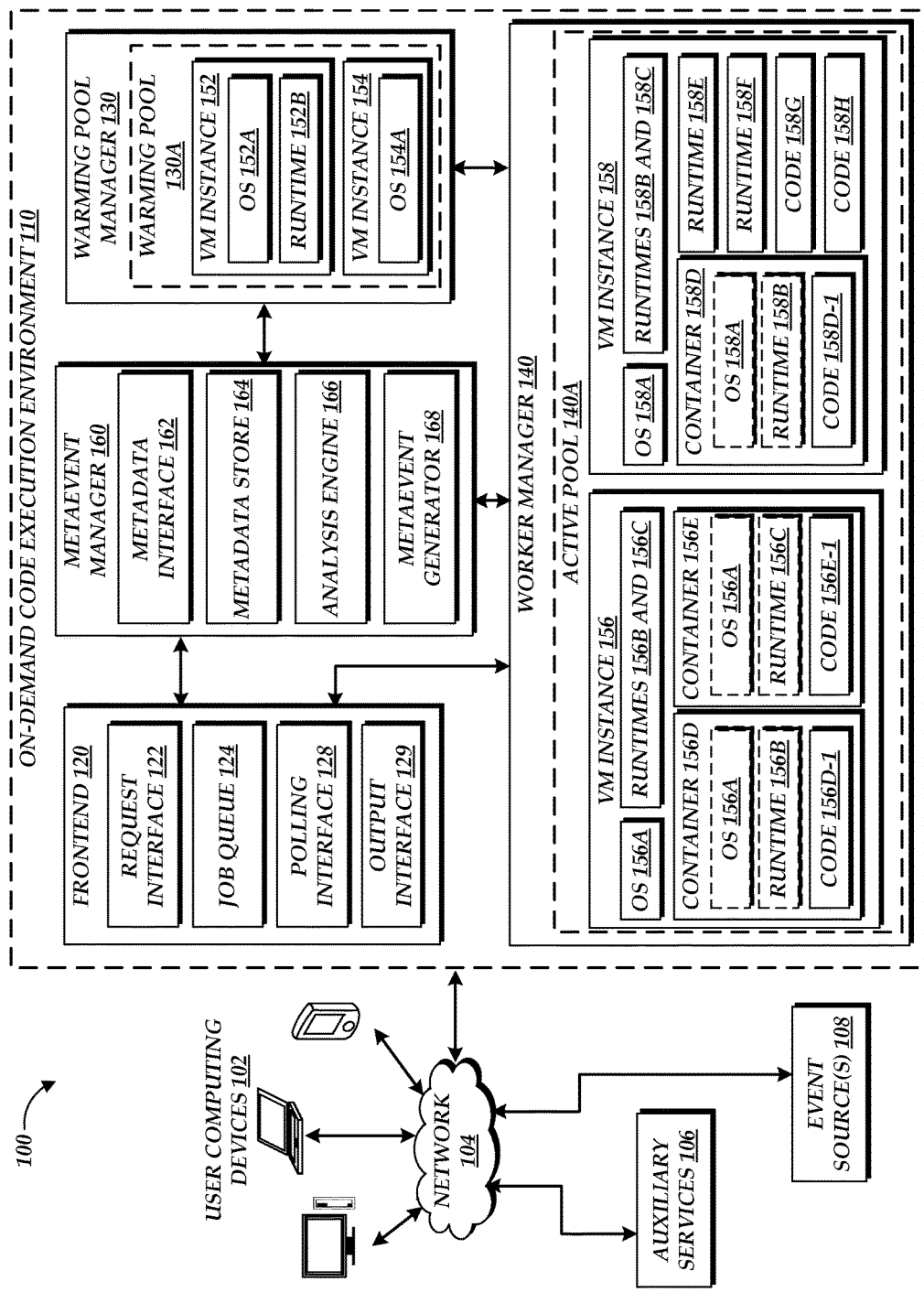
FIG. 1 is a block diagram depicting an illustrative environment in which an on-demand code execution environment can operate.

Generally described, aspects of the present disclosure relate to the definition and implementation of metaevents within a low latency, on-demand code execution environment. The code execution environment may operate as part of a system of rapidly provisioned and released computing resources, often referred to as a "cloud computing environment." Specifically, the code execution environment may include one or more virtual machine instances that are "pre-warmed" (e.g., booted into an operating system and executing a complete or substantially complete runtime environment) and configured to enable execution of user-defined code, such that the code may be executed rapidly without initializing the virtual machine instance. Generally speaking, "events" on an on-demand code execution environment can correspond to states of or actions occurring on the on-demand code execution environment, or in other systems in communication with the on-demand code execution environment, that may be utilized as triggers to cause execution of code within the on-demand code execution environment. For example, events at the on-demand code execution environment may include calls (either automated or manual) made to an application programming interface (API) or detection, at the on-demand code execution environment, that a set of event criteria have been satisfied. "Metaevents" can generally refer to events that are defined at least partly by metadata gathered on the on-demand code execution environment, which may relate to the operation of the on-demand code execution environment or other related systems. For example, a user may wish to ensure that a given event is detected by the on-demand code execution environment every 10 minutes. The user may therefore define a metaevent, within the on-demand code execution environment, that monitors the environment to determine, at 10 minute intervals, whether at least one instance of the given event has occurred. In the instance that the event has not successfully been detected in a 10 minute period, the on-demand code execution environment may detect the occurrence of the metaevent, which can thereafter cause execution of user-specified code within the on-demand code execution environment (e.g., including code to notify the user of a failure of the given event to occur). Handling of the metaevent may itself generate metadata, which can thereafter be used to trigger one or more metaevents. In this manner, users may configure an on-demand code execution environment to not only handle specific events, but to automatically generate new events based on operation of the on-demand code execution environment.

Metadata of the on-demand code execution environment may include any data regarding operation of the on-demand code execution environment, including triggering of an event, how the event is handled at the on-demand code execution environment (e.g., detection of the event, queuing of a job, such as execution of code, corresponding to the event, execution of the job, etc.), results of the event (e.g., output of a job, potentially including error reporting), and effect of the event on the user's account on the on-demand code execution environment (e.g., billing information, quota usage information, etc.). Accordingly, a user may define metaevents to automatically process and manage any aspect of the user's account on the on-demand code execution environment. For example, the user may define metaevents to automatically monitor event frequency, report or manage successful or unsuccessful handling of events, or handle changes in the user's account on the on-demand code execution environment (e.g., by modifying handling of subsequent events to reduce effects of the events on a user's quota). In some instances, metadata may also reflect operation of the on-demand code execution environment not directly influenced by the user's actions. For example, metadata may be generated by an administrator of the on-demand code execution environment to reflect a change in operation of the environment (e.g., unexpected shutdown of the environment, modification of software utilized by the environment, etc.). A user may thereafter utilize such metadata to automatically respond to those changes (e.g., by modifying how future events are handled to account for modification of the software on the environment). In still more instances, metadata may be generated based on the on-demand code execution environment's interaction with external event sources or auxiliary services. For example, the on-demand code execution environment may be configured to periodically collect data from an external data source (e.g., a really simply syndication, or "RSS," feed or other data stream) and to generate metadata regarding that data, such as a time the data was created or retrieved, or an expected expiration of the data on the external data source. Thus, a user may, for example, define a metaevent that modifies the execution of code on the on-demand code execution environment when data required by the code on the external data source is nearing expiration. In some instances, a metaevent may be defined based on criteria corresponding to specific collections or "scopes" of metadata, such as metadata pertaining to specific events on the on-demand code execution environment, to specific jobs (e.g., executed in response to one or more events), to specific accounts (e.g., of one or more users), or to specific groups of functions or accounts. In other instances, a metaevent may be defined based on criteria corresponding to all metadata generated by the on-demand code execution environment, or all metadata available to a user associated with the metaevent. One of skill in the art will therefore appreciate that any number of metaevents may be defined based on metadata related to the on-demand code execution environment, and thereafter used to manage operation of the on-demand code execution environment on behalf of a user.

The on-demand code execution environment described herein may enable execution of events or metaevents at least partly by maintaining a pool of pre-initialized virtual machine instances that are ready for use as soon as a user request is received. Due to the pre-initialized nature of these virtual machines, delay (sometimes referred to as latency) associated with executing the user code (e.g., instance and language runtime startup time) can be significantly reduced, often to sub-100 millisecond levels.

Illustratively, the on-demand code execution environment may maintain a pool of virtual machine instances on one or more physical computing devices, where each virtual machine instance has one or more software components (e.g., operating systems, language runtimes, libraries, etc.) loaded thereon. When the on-demand code execution environment receives a request to execute the program code of a user, which specifies one or more computing constraints for executing the program code of the user, the on-demand code execution environment may select a virtual machine instance for executing the program code of the user based on the one or more computing constraints specified by the request and cause the program code of the user to be executed on the selected virtual machine instance. The program codes can be executed in isolated containers that are created on the virtual machine instances. Since the virtual machine instances in the pool have already been booted and loaded with particular operating systems and language runtimes by the time the requests are received, the delay associated with finding compute capacity that can handle the requests (e.g., by executing the user code in one or more containers created on the virtual machine instances) is significantly reduced.

The on-demand code execution environment may include a virtual machine instance manager configured to receive user code (threads, programs, etc., composed in any of a variety of programming languages) and execute the code in a highly scalable, low latency manner, without requiring user configuration of a virtual machine instance. Specifically, the virtual machine instance manager can, prior to receiving the user code and prior to receiving any information from a user regarding any particular virtual machine instance configuration, create and configure virtual machine instances according to a predetermined set of configurations, each corresponding to any one or more of a variety of run-time environments. Thereafter, the virtual machine instance manager receives user-initiated requests to execute code, and identify a pre-configured virtual machine instance to execute the code based on configuration information associated with the request. The virtual machine instance manager can further allocate the identified virtual machine instance to execute the user's code at least partly by creating and configuring containers inside the allocated virtual machine instance. Various embodiments for implementing a virtual machine instance manager and executing user code on virtual machine instances is described in more detail in U.S. patent application Ser. No. 14/502,648, entitled "PROGRAMMATIC EVENT DETECTION AND MESSAGE GENERATION FOR REQUESTS TO EXECUTE PROGRAM CODE" and filed Sep. 30, 2014 ("the '648 Application), the entirety of which is hereby incorporated by reference.

The foregoing aspects and many of the attendant advantages of this disclosure will become more readily appreciated as the same become better understood by reference to the following detailed description, when taken in conjunction with the accompanying drawings.

FIG. 1 is a block diagram of an illustrative operating environment 100 in which an on-demand code execution environment 110 may operate based on communication with user computing devices 102, auxiliary services 106, and event sources 108. By way of illustration, various example user computing devices 102 are shown in communication with the on-demand code execution environment 110, including a desktop computer, laptop, and a mobile phone. In general, the user computing devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. While depicted in FIG. 1 as distinct from the on-demand code execution environment 110, in some embodiments the user computing devices 102 may be integrated or associated with the on-demand code execution environment 110. For example, a user computing device 102 may be operated by an administrator or agent of the on-demand code execution environment 110. The on-demand code execution environment 110 may provide the user computing devices 102 with one or more user interfaces, command-line interfaces (CLI), application programing interfaces (API), and/or other programmatic interfaces for generating and uploading user-executable code, invoking the user-provided code (e.g., submitting a request to execute the user codes on the on-demand code execution environment 110), scheduling event-based jobs or timed jobs, tracking the user-provided code, and/or viewing other logging or monitoring information related to their requests and/or user codes. Although one or more embodiments may be described herein as using a user interface, it should be appreciated that such embodiments may, additionally or alternatively, use any CLIs, APIs, or other programmatic interfaces.

The illustrative environment 100 further includes one or more event sources 108, which generate events that trigger execution of user-provided code on the on-demand code execution environment. Event sources 108 can correspond to network-connected computing devices, such as servers, which generate data accessible to the on-demand computing network. For example, the event sources 108 can include web services (e.g., associated with the user computing devices 102, with the on-demand code execution environment 110, or with third parties), data bases, RSS reeds, social networking sites, or any other source of network-accessible data. In some instances, event sources 108 may be active sources, such that the event source 108 notifies the on-demand code execution environment 110 of an event (e.g., to cause execution of user-specified code). In other instances, event sources 108 may be passive, such that event data is made available for access by the on-demand code execution environment 110. While depicted in FIG. 1 as distinct from the user computing devices 102 and the on-demand code execution environment 110, in some embodiments, various event sources 108 may be implemented by either the user computing devices 102 or the on-demand code execution environment 110.

The user computing devices 102 and event sources 108 may communicate with the on-demand code execution environment 110 via network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The on-demand code execution environment 110 is depicted in FIG. 1 as operating in a distributed computing environment including several computer systems that are interconnected using one or more computer networks (not shown in FIG. 1). The on-demand code execution environment 110 could also operate within a computing environment having a fewer or greater number of devices than are illustrated in FIG. 1. Thus, the depiction of the on-demand code execution environment 110 in FIG. 1 should be taken as illustrative and not limiting to the present disclosure. For example, the on-demand code execution environment 110 or various constituents thereof could implement various Web services components, hosted or "cloud" computing environments, and/or peer to peer network configurations to implement at least a portion of the processes described herein.

Further, the on-demand code execution environment 110 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers.

In the example of FIG. 1, the on-demand code execution environment 110 is illustrated as connected to the network 104. In some embodiments, any of the components within the on-demand code execution environment 110 can communicate with other components of the on-demand code execution environment 100 via the network 104. In other embodiments, not all components of the on-demand code execution environment 110 are capable of communicating with other components of the virtual environment 100. In one example, only the frontend 120 may be connected to the network 104, and other components of the on-demand code execution environment 110 may communicate with other components of the virtual environment 100 via the frontend 120.

In FIG. 1, users, by way of user computing devices 102, may interact with the on-demand code execution environment 110 to provide executable code, and establish rules or logic defining when and how such code should be executed on the on-demand code execution environment 110. For example, a user may wish to run a piece of code in connection with a web or mobile application that the user has developed. One way of running the code would be to acquire virtual machine instances from service providers who provide infrastructure as a service, configure the virtual machine instances to suit the user's needs, and use the configured virtual machine instances to run the code. In order to avoid the complexity of this process, the user may alternatively provide the code to the on-demand code execution environment 110, and request that the on-demand code execution environment 110 execute the code using one or more pre-established virtual machine instances. The on-demand code execution environment 110 can handle the acquisition and configuration of compute capacity (e.g., containers, instances, etc., which are described in greater detail below) based on the code execution request, and execute the code using the compute capacity. The on-demand code execution environment 110 may automatically scale up and down based on the volume, thereby relieving the user from the burden of having to worry about over-utilization (e.g., acquiring too little computing resources and suffering performance issues) or under-utilization (e.g., acquiring more computing resources than necessary to run the codes, and thus overpaying).

To enable interaction with the on-demand code execution environment 110, the environment 110 includes a frontend 120, which enables interaction with the on-demand code execution environment 110. In an illustrative embodiment, the frontend 120 serves as a "front door" to the other services provided by the on-demand code execution environment 110, enabling users (via user computing devices 102) to provide, request execution of, and view results of computer executable code. As shown in FIG. 1, the frontend 120 includes a variety of components to enable interaction between the on-demand code execution environment 110 and other computing devices. Specifically, the frontend 120 includes a request interface 122, a job queue 124, a distribution manager 126, a polling interface 128, and an output interface 129. The request interface 122 may provide user computing devices 102 with the ability to upload or otherwise communication user-specified code to the on-demand code execution environment 110, and to thereafter request execution of that code. In one embodiment, the request interfaces 122 communicates with external computing devices (e.g., user computing devices 102, event sources 108, etc.) via a graphical user interface (GUI), CLI, or API. The frontend 120 processes the requests and makes sure that the requests are properly authorized. For example, the frontend 120 may determine whether the user associated with the request is authorized to access the user code specified in the request.

The user code as used herein may refer to any program code (e.g., a program, routine, subroutine, thread, etc.) written in a specific program language. In the present disclosure, the terms "code," "user code," and "program code," may be used interchangeably. Such user code may be executed to achieve a specific task, for example, in connection with a particular web application or mobile application developed by the user. For example, the user codes may be written in JavaScript (node.js), Java, Python, and/or Ruby (and/or another programming language). The request may include the user code (or the location thereof) and one or more arguments to be used for executing the user code. For example, the user may provide the user code along with the request to execute the user code. In another example, the request may identify a previously uploaded program code (e.g., using the API for uploading the code) by its name or its unique ID. In yet another example, the code may be included in the request as well as uploaded in a separate location (e.g., the storage service 108 or a storage system internal to the on-demand code execution environment 110) prior to the request is received by the on-demand code execution environment 110. The on-demand code execution environment 110 may vary its code execution strategy based on where the code is available at the time the request is processed.

The request interface 122 may receive the request to execute such user codes in response to Hypertext Transfer Protocol Secure (HTTPS) requests from a user. Also, any information (e.g., headers and parameters) included in the HTTPS request may also be processed and utilized when executing the user code. As discussed above, any other protocols, including, for example, HTTP, MQTT, and CoAP, may be used to transfer the message containing the code execution request to the request interface 122.

A user request may specify one or more third-party libraries (including native libraries) to be used along with the user code. In one embodiment, the user request is a ZIP file containing the user code and any libraries (and/or identifications of storage locations thereof). In some embodiments, the user request includes metadata that indicates the program code to be executed, the language in which the program code is written, the user associated with the request, and/or the computing resources (e.g., memory, etc.) to be reserved for executing the program code. For example, the program code may be provided with the request, previously uploaded by the user, provided by the on-demand code execution environment 110 (e.g., standard routines), and/or provided by third parties. In some embodiments, such resource-level constraints (e.g., how much memory is to be allocated for executing a particular user code) are specified for the particular user code, and may not vary over each execution of the user code. In such cases, the on-demand code execution environment 110 may have access to such resource-level constraints before each individual request is received, and the individual requests may not specify such resource-level constraints. In some embodiments, the user request may specify other constraints such as permission data that indicates what kind of permissions that the request has to execute the user code. Such permission data may be used by the on-demand code execution environment 110 to access private resources (e.g., on a private network).

In some embodiments, the user request may specify the behavior that should be adopted for handling the user request. In such embodiments, the user request may include an indicator for enabling one or more execution modes in which the user code associated with the user request is to be executed. For example, the request may include a flag or a header for indicating whether the user code should be executed in a debug mode in which the debugging and/or logging output that may be generated in connection with the execution of the user code is provided back to the user (e.g., via a console user interface). In such an example, the on-demand code execution environment 110 may inspect the request and look for the flag or the header, and if it is present, the on-demand code execution environment 110 may modify the behavior (e.g., logging facilities) of the container in which the user code is executed, and cause the output data to be provided back to the user. In some embodiments, the behavior/mode indicators are added to the request by the user interface provided to the user by the on-demand code execution environment 110. Other features such as source code profiling, remote debugging, etc. may also be enabled or disabled based on the indication provided in the request.

To manage requests for code execution, the frontend 120 further includes a job queue 124, which can maintain a record of user-requested code executions. Individual executions of user specified code may be generally referred to herein as "jobs." Illustratively, the number of jobs executable by the on-demand code execution environment 110 is limited, and as such, new jobs initiated at the on-demand code execution environment 110 (e.g., via an API request) may be placed on the job queue 124 and processed, e.g., in a first-in-first-out order. In some embodiments, the on-demand code execution environment 110 may include multiple job queues 124, such as individual job queues 124 for each user account. For example, users of the on-demand code execution environment 110 may desire to limit the rate of jobs execution on the on-demand code execution environment 110 (e.g., for cost reasons). Thus, the on-demand code execution environment 110 may utilize an account-specific job queue 124 to throttle the rate of jobs executed by a specific user account. In some instances, the on-demand code execution environment 110 may prioritize jobs, such that jobs of specific accounts or of specified priorities bypass or are prioritized within the job queue 124. In other instances, the on-demand code execution environment 110 may execute jobs immediately or substantially immediately, and thus, the job queue 124 may be omitted.

As noted above, jobs may generated at the on-demand code execution environment 110 based on explicit events detected (e.g., an API call from user computing devices 102, as received at the request interface 120). Alternatively or additionally, jobs may be generated at the on-demand code execution environment 110 based on events detected from data retrieved from one or more event sources 108. To facilitate interaction with external sources 108, the frontend 120 can include a polling interface 128, which operates to poll event sources 108 for data. Illustratively, the polling interface 128 may periodically transmit a request to one or more user-specified event sources 108 to retrieve any newly available data (e.g., social network "posts," news articles, etc.), and to determine whether that data corresponds to a user-established event triggering the execution of user-provided code on the on-demand code execution environment 110. Illustratively, each event may be defined by one or more criteria, including but not limited to whether new data is available at the event source 108, the type or content of the data, or timing information corresponding to the data.

In addition to events occurring based on explicit user requests and data from event sources 108, the on-demand code execution environment 110 may in some instances operate to generate events independently. For example, the on-demand code execution environment 110 may operate (based on instructions from a user) to generate an event each of a number of specified time intervals (e.g., every 10 minutes). In some embodiments, these events may generate metadata, which may in turn be used by the on-demand code execution environment 110 to detect a metaevent in accordance with embodiments of the present application. In this manner, independently generated events may be utilized as user-specified "timers" for use in creating associated metaevents. For example, a user may define a metaevent as occurring at each instance of an independently generated "timer" event, so long as no API calls are received during an immediately preceding period of time.

The frontend 120 further includes an output interface 129 configured to output information regarding the processing of jobs on the on-demand code execution environment 110. Illustratively, the output interface 129 may transmit data regarding executed jobs (e.g., results of code executed based on a job, errors related to the job, or details of the job's processing, such as total time required to complete the job, total data processed via the job, etc.) to the user computing devices 102 or to auxiliary services 106, which may include, for example, billing or logging services.

To process jobs via execution of user-specific code, the on-demand code execution environment 110 includes a warming pool manager 130, which "pre-warms" (e.g., initializes) virtual machine instances to enable jobs to be processed quickly, without the delay caused by initialization of the virtual machines. The on-demand code execution environment 110 further includes a worker manager 140, which manages active virtual machine instances (e.g., currently assigned to execute user-specified code in response to created jobs).

The warming pool manager 130 ensures that virtual machine instances are ready to be used by the worker manager 140 when the on-demand code execution environment 110 receives a request to execute user code on the on-demand code execution environment 110. In the example illustrated in FIG. 1, the warming pool manager 130 manages the warming pool 130A, which is a group (sometimes referred to as a pool) of pre-initialized and pre-configured virtual machine instances that may be used to service incoming user code execution requests. In some embodiments, the warming pool manager 130 causes virtual machine instances to be booted up on one or more physical computing machines within the on-demand code execution environment 110 and added to the warming pool 130A. For example, the warming pool manager 130 may cause additional instances to be added to the warming pool 130A based on the available capacity in the warming pool 130A to service incoming requests. In some embodiments, the warming pool manager 130 may utilize both physical computing devices within the on-demand code execution environment 110 and one or more virtual machine instance services to acquire and maintain compute capacity that can be used to service code execution requests received by the frontend 120. In some embodiments, the on-demand code execution environment 110 may comprise one or more logical knobs or switches for controlling (e.g., increasing or decreasing) the available capacity in the warming pool 130A. For example, a system administrator may use such a knob or switch to increase the capacity available (e.g., the number of pre-booted instances) in the warming pool 130A during peak hours. In some embodiments, virtual machine instances in the warming pool 130A can be configured based on a predetermined set of configurations independent from a specific user request to execute a user's code. The predetermined set of configurations can correspond to various types of virtual machine instances to execute user codes. The warming pool manager 130 can optimize types and numbers of virtual machine instances in the warming pool 130A based on one or more metrics related to current or previous user code executions.

As shown in FIG. 1, instances may have operating systems (OS) and/or language runtimes loaded thereon. For example, the warming pool 130A managed by the warming pool manager 130 comprises instances 152, 154. The instance 152 includes an OS 152A and a runtime 152B. The instance 154 includes an OS 154A. In some embodiments, the instances in the warming pool 130A may also include containers (which may further contain copies of operating systems, runtimes, user codes, etc.), which are described in greater detail below. Although the instance 152 is shown in FIG. 1 to include a single runtime, in other embodiments, the instances depicted in FIG. 1 may include two or more runtimes, each of which may be used for running a different user code. In some embodiments, the warming pool manager 130 may maintain a list of instances in the warming pool 130A. The list of instances may further specify the configuration (e.g., OS, runtime, container, etc.) of the instances.

In some embodiments, the virtual machine instances in the warming pool 130A may be used to serve any user's request. In one embodiment, all the virtual machine instances in the warming pool 130A are configured in the same or substantially similar manner. In another embodiment, the virtual machine instances in the warming pool 130A may be configured differently to suit the needs of different users. For example, the virtual machine instances may have different operating systems, different language runtimes, and/or different libraries loaded thereon. In yet another embodiment, the virtual machine instances in the warming pool 130A may be configured in the same or substantially similar manner (e.g., with the same OS, language runtimes, and/or libraries), but some of those instances may have different container configurations. For example, one instance might have a container created therein for running code written in Python, and another instance might have a container created therein for running code written in Ruby. In some embodiments, multiple warming pools 130A, each having identically-configured virtual machine instances, are provided.

The warming pool manager 130 may pre-configure the virtual machine instances in the warming pool 130A, such that each virtual machine instance is configured to satisfy at least one of the operating conditions that may be requested or specified by the user request to execute program code on the on-demand code execution environment 110. In one embodiment, the operating conditions may include program languages in which the potential user codes may be written. For example, such languages may include Java, JavaScript, Python, Ruby, and the like. In some embodiments, the set of languages that the user codes may be written in may be limited to a predetermined set (e.g., set of 4 languages, although in some embodiments sets of more or less than four languages are provided) in order to facilitate pre-initialization of the virtual machine instances that can satisfy requests to execute user codes. For example, when the user is configuring a request via a user interface provided by the on-demand code execution environment 110, the user interface may prompt the user to specify one of the predetermined operating conditions for executing the user code. In another example, the service-level agreement (SLA) for utilizing the services provided by the on-demand code execution environment 110 may specify a set of conditions (e.g., programming languages, computing resources, etc.) that user requests should satisfy, and the on-demand code execution environment 110 may assume that the requests satisfy the set of conditions in handling the requests. In another example, operating conditions specified in the request may include: the amount of compute power to be used for processing the request; the type of the request (e.g., HTTP vs. a triggered event); the timeout for the request (e.g., threshold time after which the request may be terminated); and security policies (e.g., may control which instances in the warming pool 130A are usable by which user), among other specified conditions.

The worker manager 140 manages the instances used for servicing incoming code execution requests. In the example illustrated in FIG. 1, the worker manager 140 manages the active pool 140A, which is a group (sometimes referred to as a pool) of virtual machine instances that are currently assigned to one or more users. Although the virtual machine instances are described here as being assigned to a particular user, in some embodiments, the instances may be assigned to a group of users, such that the instance is tied to the group of users and any member of the group can utilize resources on the instance. For example, the users in the same group may belong to the same security group (e.g., based on their security credentials) such that executing one member's code in a container on a particular instance after another member's code has been executed in another container on the same instance does not pose security risks. Similarly, the worker manager 140 may assign the instances and the containers according to one or more policies that dictate which requests can be executed in which containers and which instances can be assigned to which users. An example policy may specify that instances are assigned to collections of users who share the same account (e.g., account for accessing the services provided by the on-demand code execution environment 110). In some embodiments, the requests associated with the same user group may share the same containers (e.g., if the user codes associated therewith are identical). In some embodiments, a request does not differentiate between the different users of the group and simply indicates the group to which the users associated with the requests belong.

As shown in FIG. 1, instances may have operating systems (OS), language runtimes, and containers. The containers may have individual copies of the OS and the runtimes and user codes loaded thereon. In the example of FIG. 1, the active pool 140A managed by the worker manager 140 includes the instances 156, 158. The instance 156 has an OS 156A, runtimes 156B, 156C, and containers 156D, 156E. The container 156D includes a copy of the OS 156A, a copy of the runtime 156B, and a copy of a code 156D-1. The container 156E includes a copy of the OS 156A, a copy of the runtime 156C, and a copy of a code 156E-1. The instance 158 has an OS 158A, runtimes 158B, 158C, 158E, 158F, a container 158D, and codes 158G, 158H. The container 158D has a copy of the OS 158A, a copy of the runtime 158B, and a copy of a code 158D-1. As illustrated in FIG. 1, instances may have user codes loaded thereon, and containers within those instances may also have user codes loaded therein. In some embodiments, the worker manager 140 may maintain a list of instances in the active pool 140A. The list of instances may further specify the configuration (e.g., OS, runtime, container, etc.) of the instances. In some embodiments, the worker manager 140 may have access to a list of instances in the warming pool 130A (e.g., including the number and type of instances). In other embodiments, the worker manager 140 requests compute capacity from the warming pool manager 130 without having knowledge of the virtual machine instances in the warming pool 130A.

In the example illustrated in FIG. 1, user codes are executed in isolated on-demand code execution environments referred to as containers (e.g., containers 156D, 156E, 158D). Containers are logical units created within a virtual machine instance using the resources available on that instance. For example, the worker manager 140 may, based on information specified in the request to execute user code, create a new container or locate an existing container in one of the instances in the active pool 140A and assigns the container to the request to handle the execution of the user code associated with the request. In one embodiment, such containers are implemented as Linux containers.

Once a request has been successfully processed by the frontend 120, the worker manager 140 finds capacity to service the request to execute user code on the on-demand code execution environment 110. For example, if there exists a particular virtual machine instance in the active pool 140A that has a container with the same user code loaded therein (e.g., code 156D-1 shown in the container 156D), the worker manager 140 may assign the container to the request and cause the user code to be executed in the container. Alternatively, if the user code is available in the local cache of one of the virtual machine instances (e.g., codes 158G, 158H, which are stored on the instance 158 but do not belong to any individual containers), the worker manager 140 may create a new container on such an instance, assign the container to the request, and cause the used code to be loaded and executed in the container.

If the worker manager 140 determines that the user code associated with the request is not found on any of the instances (e.g., either in a container or the local cache of an instance) in the active pool 140A, the worker manager 140 may determine whether any of the instances in the active pool 140A is currently assigned to the user associated with the request and has compute capacity to handle the current request. If there is such an instance, the worker manager 140 may create a new container on the instance and assign the container to the request. Alternatively, the worker manager 140 may further configure an existing container on the instance assigned to the user, and assign the container to the request. For example, the worker manager 140 may determine that the existing container may be used to execute the user code if a particular library demanded by the current user request is loaded thereon. In such a case, the worker manager 140 may load the particular library and the user code onto the container and use the container to execute the user code.

If the active pool 140 does not contain any instances currently assigned to the user, the worker manager 140 pulls a new virtual machine instance from the warming pool 130A, assigns the instance to the user associated with the request, creates a new container on the instance, assigns the container to the request, and causes the user code to be downloaded and executed on the container.

In some embodiments, the on-demand code execution environment 110 is adapted to begin execution of the user code shortly after it is received (e.g., by the frontend 120). A time period can be determined as the difference in time between initiating execution of the user code (e.g., in a container on a virtual machine instance associated with the user) and receiving a request to execute the user code (e.g., received by a frontend). The on-demand code execution environment 110 is adapted to begin execution of the user code within a time period that is less than a predetermined duration. In one embodiment, the predetermined duration is 500 ms. In another embodiment, the predetermined duration is 300 ms. In another embodiment, the predetermined duration is 100 ms. In another embodiment, the predetermined duration is 50 ms. In another embodiment, the predetermined duration is 10 ms. In another embodiment, the predetermined duration may be any value chosen from the range of 10 ms to 500 ms. In some embodiments, the on-demand code execution environment 110 is adapted to begin execution of the user code within a time period that is less than a predetermined duration if one or more conditions are satisfied. For example, the one or more conditions may include any one of: (1) the user code is loaded on a container in the active pool 140 at the time the request is received; (2) the user code is stored in the code cache of an instance in the active pool 140 at the time the request is received; (3) the active pool 140A contains an instance assigned to the user associated with the request at the time the request is received; or (4) the warming pool 130A has capacity to handle the request at the time the request is received.

Once the worker manager 140 locates one of the virtual machine instances in the warming pool 130A that can be used to serve the user code execution request, the warming pool manager 130 or the worker manger 140 takes the instance out of the warming pool 130A and assigns it to the user associated with the request. The assigned virtual machine instance is taken out of the warming pool 130A and placed in the active pool 140A. In some embodiments, once the virtual machine instance has been assigned to a particular user, the same virtual machine instance cannot be used to service requests of any other user. This provides security benefits to users by preventing possible co-mingling of user resources. Alternatively, in some embodiments, multiple containers belonging to different users (or assigned to requests associated with different users) may co-exist on a single virtual machine instance. Such an approach may improve utilization of the available compute capacity.

In some embodiments, the on-demand code execution environment 110 may maintain a separate cache in which user codes are stored to serve as an intermediate level of caching system between the local cache of the virtual machine instances and a web-based network storage (e.g., accessible via the network 104). The various scenarios that the worker manager 140 may encounter in servicing the request are described in greater detail within the '648 application, incorporated by reference above (e.g., at FIG. 4 of the '648 application).

After the user code has been executed, the worker manager 140 may tear down the container used to execute the user code to free up the resources it occupied to be used for other containers in the instance. Alternatively, the worker manager 140 may keep the container running to use it to service additional requests from the same user. For example, if another request associated with the same user code that has already been loaded in the container, the request can be assigned to the same container, thereby eliminating the delay associated with creating a new container and loading the user code in the container. In some embodiments, the worker manager 140 may tear down the instance in which the container used to execute the user code was created. Alternatively, the worker manager 140 may keep the instance running to use it to service additional requests from the same user. The determination of whether to keep the container and/or the instance running after the user code is done executing may be based on a threshold time, the type of the user, average request volume of the user, and/or other operating conditions. For example, after a threshold time has passed (e.g., 5 minutes, 30 minutes, 1 hour, 24 hours, 30 days, etc.) without any activity (e.g., running of the code), the container and/or the virtual machine instance is shutdown (e.g., deleted, terminated, etc.), and resources allocated thereto are released. In some embodiments, the threshold time passed before a container is torn down is shorter than the threshold time passed before an instance is torn down.

In some embodiments, the on-demand code execution environment 110 may provide data to one or more of the auxiliary services 106 as it services incoming code execution requests. For example, the frontend 120 may communicate with the monitoring/logging/billing services included within the auxiliary services 106. The monitoring/logging/billing services may include: a monitoring service for managing monitoring information received from the on-demand code execution environment 110, such as statuses of containers and instances on the on-demand code execution environment 110; a logging service for managing logging information received from the on-demand code execution environment 110, such as activities performed by containers and instances on the on-demand code execution environment 110; and a billing service for generating billing information associated with executing user code on the on-demand code execution environment 110 (e.g., based on the monitoring information and/or the logging information managed by the monitoring service and the logging service). In addition to the system-level activities that may be performed by the monitoring/logging/billing services (e.g., on behalf of the on-demand code execution environment 110), the monitoring/logging/billing services may provide application-level services on behalf of the user code executed on the on-demand code execution environment 110. For example, the monitoring/logging/billing services may monitor and/or log various inputs, outputs, or other data and parameters on behalf of the user code being executed on the on-demand code execution environment 110.

In some embodiments, the worker manager 140 may perform health checks on the instances and containers managed by the worker manager 140 (e.g., those in the active pool 140A). For example, the health checks performed by the worker manager 140 may include determining whether the instances and the containers managed by the worker manager 140 have any issues of (1) misconfigured networking and/or startup configuration, (2) exhausted memory, (3) corrupted file system, (4) incompatible kernel, and/or any other problems that may impair the performance of the instances and the containers. In one embodiment, the worker manager 140 performs the health checks periodically (e.g., every 5 minutes, every 30 minutes, every hour, every 24 hours, etc.). In some embodiments, the frequency of the health checks may be adjusted automatically based on the result of the health checks. In other embodiments, the frequency of the health checks may be adjusted based on user requests. In some embodiments, the worker manager 140 may perform similar health checks on the instances and/or containers in the warming pool 130A. The instances and/or the containers in the warming pool 130A may be managed either together with those instances and containers in the active pool 140A or separately. In some embodiments, in the case where the health of the instances and/or the containers in the warming pool 130A is managed separately from the active pool 140A, the warming pool manager 130, instead of the worker manager 140, may perform the health checks described above on the instances and/or the containers in the warming pool 130A.

The worker manager 140 may include an instance allocation unit for finding compute capacity (e.g., containers) to service incoming code execution requests and a user code execution unit for facilitating the execution of user codes on those containers. An example configuration of the worker manager 140 is described in greater detail within the '648 application, incorporated by reference above (e.g., within FIG. 2 of the '648 application).

In the depicted example, virtual machine instances ("instances") 152, 154 are shown in a warming pool 130A managed by the warming pool manager 130, and instances 156, 158 are shown in an active pool 140A managed by the worker manager 140. The illustration of the various components within the on-demand code execution environment 110 is logical in nature and one or more of the components can be implemented by a single computing device or multiple computing devices. For example, the instances 152, 154, 156, 158 can be implemented on one or more physical computing devices in different various geographic regions. Similarly, each of the frontend 120, the warming pool manager 130, and the worker manager 140 can be implemented across multiple physical computing devices. Alternatively, one or more of the frontend 120, the warming pool manager 130, and the worker manager 140 can be implemented on a single physical computing device. In some embodiments, the on-demand code execution environment 110 may comprise multiple frontends, multiple warming pool managers, and/or multiple worker managers. Although four virtual machine instances are shown in the example of FIG. 1, the embodiments described herein are not limited as such, and one skilled in the art will appreciate that the on-demand code execution environment 110 may comprise any number of virtual machine instances implemented using any number of physical computing devices. Similarly, although a single warming pool and a single active pool are shown in the example of FIG. 1, the embodiments described herein are not limited as such, and one skilled in the art will appreciate that the on-demand code execution environment 110 may comprise any number of warming pools and active pools.

In accordance with embodiments of the present disclosure, the on-demand code execution environment 110 further includes a metaevent manager 160, which includes components enabling the creation of metaevents on the on-demand code execution environment 110. Generally described, metaevents may include events triggered based on metadata related to the operation of the on-demand code execution environment 110, as generated by the components of the on-demand code execution environment 110 or external data sources (e.g., auxiliary services 106). As described below, metaevents may be generated at the metaevent manager, and transmitted to the frontend 120 to cause creation of a job, which may thereafter be processed by the on-demand code execution environment 110. Accordingly, the use of metaevents may enable users or administrators of the on-demand code execution environment 110 to automatically manage operation of the on-demand code execution environment 110 and the jobs processed thereon. While depicted in FIG. 1 as distinct within the on-demand code execution environment 110, in some embodiments the metaevent manager 160 may be implemented by other devices or components within the on-demand code execution environment 110. For example, the metaevent manager may be implemented by code executed on one or more VM instances (e.g., VM instances 156 or 158) within the worker manager 140.

To enable reception and processing of metadata, the metaevent manager 160 includes a metadata interface 162, which interacts with various components of the on-demand code execution environment 110 to receive metadata. For example, metadata may be received from the request interface 122 to indicate that a job has been created based on detection of an event at the frontend 120 (e.g., reception of an API call), from the job queue 124 to indicate queuing of a job or movement of a job within or out of the queue, from the polling interface 128 to indicate the detection of new data on event sources 108, or from the output interface 129 to indicate the results of a processed job. Metadata may indicate other events or states associated with the on-demand code execution environment 110, as well, including but not limited to data pertaining to events or errors occurring on the on-demand code execution environment 110 (e.g., aggregate event or error rates pertaining to the environment 110 as a whole, pertaining to a specific account, specific collections of events or jobs, etc.) and data pertaining to the administration or general operation of the on-demand code execution environment 110 (e.g., updates or modifications to components within the on-demand code execution environment 110, such as a change in a version of software executed by virtual machines within the on-demand code execution environment 110, etc.).

The metaevent manager 160 further includes a metadata store 160 to store the received metadata, or data derived from the received metadata. Illustratively, the metadata store 160 may include a database, either relational or non-relational, that stores received metadata. To enable rapid access to metadata, the metadata store 160 may additionally or alternatively include a data cache, which may be implemented as a distributed memory object caching system. Examples of such caching systems include Memached and Redis, the operations of both are known in the art. In some embodiments, the metadata store 160 may include one or more data stores optimized for the type of metadata stored. For example, one illustrative use of metaevents may include detecting whether another specified event has (or has not) occurred during a defined time interval. In such an instance, the occurrence of an event may be indicated within a data store by a single bit, where a zero value indicates the absence of an event, and a one value indicates the occurrence of the event. Accordingly, the metadata store 160 may include an array of bits, each bit corresponding to an event being monitored by one or more users. As events are detected at the metaevent manager 160 (e.g., as reported by the frontend 120), the metadata interface 162 may "flip" a corresponding bit within the array to indicate the events occurrence. At each defined time interval (e.g., the interval at which events are monitored), the metaevent manager 160 may read out the array of bits to determine whether or not each event has occurred (e.g., in order to generate a metaevent based on user-defined criteria), as well as reset each bit. Because events are likely to occur at a rapid pace relative to the defined time interval, the array of bits may be optimized for high-write, low-read access. For example, the array of bits may be split into multiple bit arrays, arranged into a balanced binary tree structure. Upper "branches" of the binary tree may be replicated across multiple data stores or computing devices 160 within the on-demand code execution environment 110, such that the tree may be accessed by multiple computing devices at any given time. In this manner, the tree may enable a very high number of events to be tracked in real-time with minimal memory use. Various additional data stores may be included within the metadata store 164 in accordance with the metadata to be tracked.

The metaevent manager 160 further include an analysis engine 166 configured to read data from the metadata store 164 and determine whether any metaevents should be created. Illustratively, the analysis engine 166 may operate according to a set of user-defined criteria, which map or otherwise associate metadata-based criteria to corresponding metaevents. For example, one set of user-defined criteria may indicate that if a user-designated event does not occur at least every X minutes, user-specified code should be executed on the on-demand code execution environment 110 (which may, for example, cause an error notification to be generated to a user computing device or take other action to diagnose or correct potential errors with the event). The user-defined criteria may specify any number of criteria corresponding to a metaevent, as well as the relation between those criteria (e.g., by connecting criteria via a logical operator). In some instances, the user-defined criteria may itself be specified as user-defined code. For example, the user-defined criteria may be specified according to an SQL query, or a code function that returns one of a number of possible values (e.g., a Boolean value to indicate that the metaevent has or has not occurred based on metadata inputs to the code function). Accordingly, the analysis engine may read data from the metadata 164 and compare such data to a maintained set of metaevent criteria to determine whether metaevents have occurred. In some embodiments, metadata and metaevents may be account-specific, such that a user associated with a first account cannot access metadata or metaevents associated with a second account. In other embodiments, metaevents or metadata may be event or job specific, such that metadata generated based on specific events or jobs (or collections thereof) is only available to specific metaevents (or collections thereof). In still more embodiments, metaevents or metadata may be public, or shared between user accounts. For example, the on-demand code execution environment 110 may maintain a set of metadata regarding the operation of the on-demand code execution environment 110 generally, which may be referenced in metaevent criteria of various uses to take action in response to potential occurrences on the on-demand code execution environment 110 (e.g., a change in software executed by the on-demand code execution environment 110, shutdown of the on-demand code execution environment 110, etc.). Metadata regarding the operation of the on-demand code execution environment 110 generally may additionally or alternatively be kept private (e.g., for use in triggering metaevents defined by an administrator the on-demand code execution environment 110), and not made generally available to all users of the on-demand code execution environment 110.

In some instances, the analysis engine 166 may analyze metadata to detect occurrence of a metaevent for a given user account on a timed-interval basis (e.g., every second, minute, hour, etc.). To reduce the frequency and volume of access to the metadata store 164, the analysis engine may analyze metadata for different accounts on a rotational basis. For example, where analysis occurs every 10 minutes, the analysis engine 166 may analyze metaevent criteria corresponding to 10% of user accounts of the on-demand code execution environment 110 each minute, such that the metadata store 164 is accessed at a continuous, relatively low level (as compared to attempting to process all metaevent criteria every 10 minutes). In one embodiment, intervals may be maintained by the metaevent manager 160 itself (e.g., based on a reference time keeping device of the metaevent manager 160). In other embodiments, intervals may be specified by an external device, such as the frontend 120 or other component of the on-demand code execution environment 110. For example, each interval may be detected at the metaevent manager 160 based on the occurrence of a defined event on the on-demand code execution environment 110 (e.g., a "timer" event defined by a user computing device or the on-demand code execution environment 110 itself). In still more embodiments, the analysis engine 166 may analyze metadata to detect occurrence of a metaevent for a given user account on each occurrence of a defined event, regardless of the frequency or timing of an event. For example, a user may request that a set of metaevent criteria corresponding to the user's account be analyzed each time an API call to the on-demand code execution environment 110 is made. In some instances, the API call (or other event) may specify parameters for what metadata should be analyzed with respect to a user's specified metaevent criteria. For example, an API call or other event may specify that the analysis engine 166 should only analyze metadata generated in a specified time period (e.g., absolute or relative to a current time period), or since a prior analysis with respect to the user's specified metaevent criteria was conducted. As discussed above, the metadata analyzed by the analysis engine 166 may include any information regarding the operation of the on-demand code execution environment 110, such as information regarding the occurrence or lack of occurrence of a specific event (e.g., including values associated with an event or other details of such events), information regarding the distribution or execution of jobs corresponding to events (e.g., including parameters passed to code functions executed to process a job), timing of events or functions, errors or results of events or functions, etc.

While operation of the analysis engine 166 is described herein with respect to the metadata store 164, in some embodiments the analysis engine 166 may further operate in real-time or substantially real-time based on metadata received at the metaevent manager 160. For example, the analysis engine 166 may analyze individual items of metadata received at the metaevent manager 160 to determine whether that metadata (e.g., individually or in conjunction with the metadata stored in the metadata store 164) satisfies metaevent criteria. In such embodiments, metaevent criteria may be specified based on a variety of real-time data stream analysis query languages, such as StreamSQL. Moreover, in some embodiments, the analysis engine 166 may additionally or alternatively collect metadata from preexisting sources of data, such as data logs maintained by the on-demand code execution environment or by auxiliary services 106 (e.g., billing services or other data logging services, etc.).

When the analysis engine 166 detects that a metaevent has occurred (e.g., that a set of user-defined metaevent criteria has been satisfied by metadata), the metaevent manager 160 may utilize a metaevent generator 168 to generate a metaevent for handling by the on-demand code execution environment 110. Illustratively, the metaevent generator 168 may construct a metaevent based on the metaevent criteria corresponding to the metaevent. Accordingly, the metaevent may specify one or more sets of user-provided code on the on-demand code execution environment 110, as well as data to be passed to the user-provided code (e.g., as extracted or derived from metadata). For example, where metaevent criteria specifies that a metaevent should be created when another event does not occur within a predefined interval, the metaevent may specify a user-defined code function to be called on the on-demand code execution environment 110, as well as data to be passed to the function, such as the last time the other event occurred or the results of that event occurrence. The metaevent generator 168 can thereafter pass the event to the frontend 120 (e.g., for placement in the job queue 124) for handling by the on-demand code execution environment 110. Because processing of a metaevent may itself generate metadata that, in turn, results in generation of subsequent metaevents, various metaevents may be utilized to automate virtually all aspects of operation of the on-demand code execution environment 110. For example, use of metaevents may enable a user to automatically detect metadata indicating a problem with an event, job, account, or service, and to execute user-specified code or functions intended to correct such a problem (e.g., by altering resources or configurations of the event, job, account, or service, or by otherwise taking action in response to the observed metadata regarding the event, job, account, or service).

While not shown in FIG. 1, in some embodiments, the on-demand code execution environment 110 may include multiple frontends 120. In such embodiments, a load balancer may be provided to distribute the incoming requests to the multiple frontends 120, for example, in a round-robin fashion. In some embodiments, the manner in which the load balancer distributes incoming requests to the multiple frontends 120 may be based on the state of the warming pool 130A and/or the active pool 140A. For example, if the capacity in the warming pool 130A is deemed to be sufficient, the requests may be distributed to the multiple frontends 120 based on the individual capacities of the frontends 120 (e.g., based on one or more load balancing restrictions). On the other hand, if the capacity in the warming pool 130A is less than a threshold amount, one or more of such load balancing restrictions may be removed such that the requests may be distributed to the multiple frontends 120 in a manner that reduces or minimizes the number of virtual machine instances taken from the warming pool 130A. For example, even if, according to a load balancing restriction, a request is to be routed to Frontend A, if Frontend A needs to take an instance out of the warming pool 130A to service the request but Frontend B can use one of the instances in its active pool to service the same request, the request may be routed to Frontend B.

Figure 2:
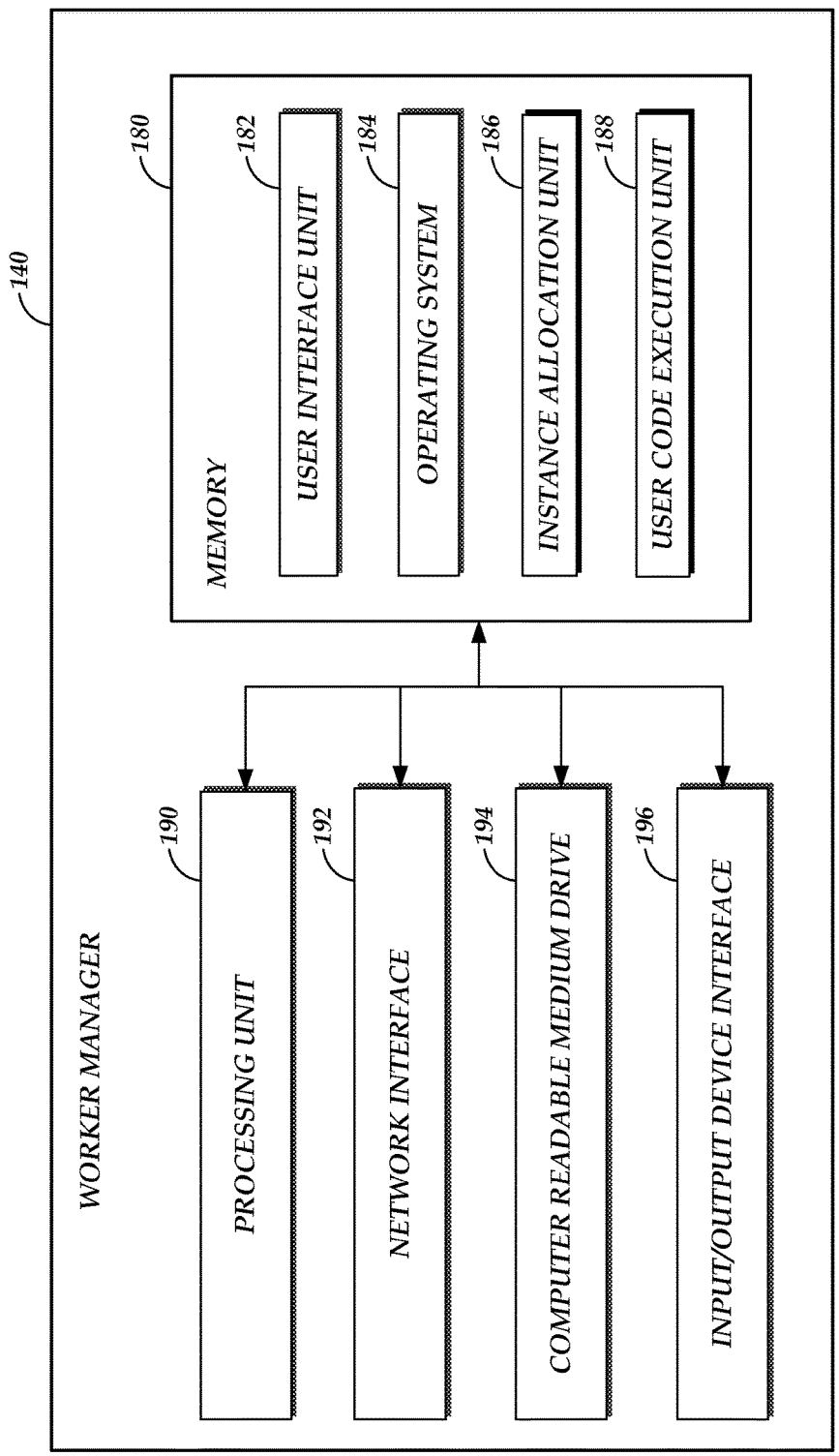
FIG. 2 depicts a general architecture of a computing device providing an on-demand code execution environment manager for implementing low latency on-demand code execution.

FIG. 2 depicts a general architecture of a computing system (referenced as worker manager 140) that manages the virtual machine instances in the on-demand code execution environment 110. The general architecture of the worker manager 140 depicted in FIG. 2 includes an arrangement of computer hardware and software modules that may be used to implement aspects of the present disclosure. The hardware modules may be implemented with physical electronic devices, as discussed in greater detail below. The worker manager 140 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 1. As illustrated, the worker manager 140 includes a processing unit 190, a network interface 192, a computer readable medium drive 194, and an input/output device interface 196, all of which may communicate with one another by way of a communication bus. The network interface 192 may provide connectivity to one or more networks or computing systems. The processing unit 190 may thus receive information and instructions from other computing systems or services via the network 104. The processing unit 190 may also communicate to and from memory 180 and further provide output information for an optional display (not shown) via the input/output device interface 196. The input/output device interface 196 may also accept input from an optional input device (not shown).

The memory 180 may contain computer program instructions (grouped as modules in some embodiments) that the processing unit 190 executes in order to implement one or more aspects of the present disclosure. The memory 180 generally includes RAM, ROM and/or other persistent, auxiliary or non-transitory computer readable media. The memory 180 may store an operating system 184 that provides computer program instructions for use by the processing unit 190 in the general administration and operation of the worker manager 140. The memory 180 may further include computer program instructions and other information for implementing aspects of the present disclosure. For example, in one embodiment, the memory 180 includes a user interface unit 182 that generates user interfaces (and/or instructions therefor) for display upon a computing device, e.g., via a navigation and/or browsing interface such as a browser or application installed on the computing device. In addition, the memory 180 may include and/or communicate with one or more data repositories (not shown), for example, to access user program codes and/or libraries.

In addition to and/or in combination with the user interface unit 182, the memory 180 may include an instance allocation unit 186 and a user code execution unit 188 that may be executed by the processing unit 190. In one embodiment, the user interface unit 182, instance allocation unit 186, and user code execution unit 188 individually or collectively implement various aspects of the present disclosure, e.g., finding compute capacity (e.g., a container) to be used for executing user code, causing the user code to be loaded and executed on the container, etc. as described further below.

The instance allocation unit 186 finds the compute capacity to be used for servicing a request to execute user code. For example, the instance allocation unit 186 identifies a virtual machine instance and/or a container that satisfies any constraints specified by the request and assigns the identified virtual machine instance and/or container to the user or the request itself. The instance allocation unit 186 may perform such identification based on the programming language in which the user code is written. For example, if the user code is written in Python, and the instance allocation unit 186 may find an virtual machine instance (e.g., in the warming pool 130A of FIG. 1) having the Python runtime pre-loaded thereon and assign the virtual machine instance to the user. In another example, if the program code specified in the request of the user is already loaded on an existing container or on another virtual machine instance assigned to the user (e.g., in the active pool 140A of FIG. 1), the instance allocation unit 186 may cause the request to be processed in the container or in a new container on the virtual machine instance. In some embodiments, if the virtual machine instance has multiple language runtimes loaded thereon, the instance allocation unit 186 may create a new container on the virtual machine instance and load the appropriate language runtime on the container based on the computing constraints specified in the request.

The user code execution unit 188 manages the execution of the program code specified by the request of the user once a particular virtual machine instance has been assigned to the user associated with the request and a container on the particular virtual machine instance has been assigned to the request. If the code is pre-loaded in a container on the virtual machine instance assigned to the user, the code is simply executed in the container. If the code is available via a network storage (e.g., storage service 108 of FIG. 1), the user code execution unit 188 downloads the code into a container on the virtual machine instance and causes the code to be executed (e.g., by communicating with the frontend 120 of FIG. 1) once it has been downloaded.

While the instance allocation unit 186 and the user code execution unit 188 are shown in FIG. 2 as part of the worker manager 140, in other embodiments, all or a portion of the instance allocation unit 186 and the user code execution unit 188 may be implemented by other components of the on-demand code execution environment 110 and/or another computing device. For example, in certain embodiments of the present disclosure, another computing device in communication with the on-demand code execution environment 110 may include several modules or components that operate similarly to the modules and components illustrated as part of the worker manager 140.

In some embodiments, the worker manager 140 may further include components other than those illustrated in FIG. 2. For example, the memory 180 may further include a container manager for managing creation, preparation, and configuration of containers within virtual machine instances.

Figure 3:
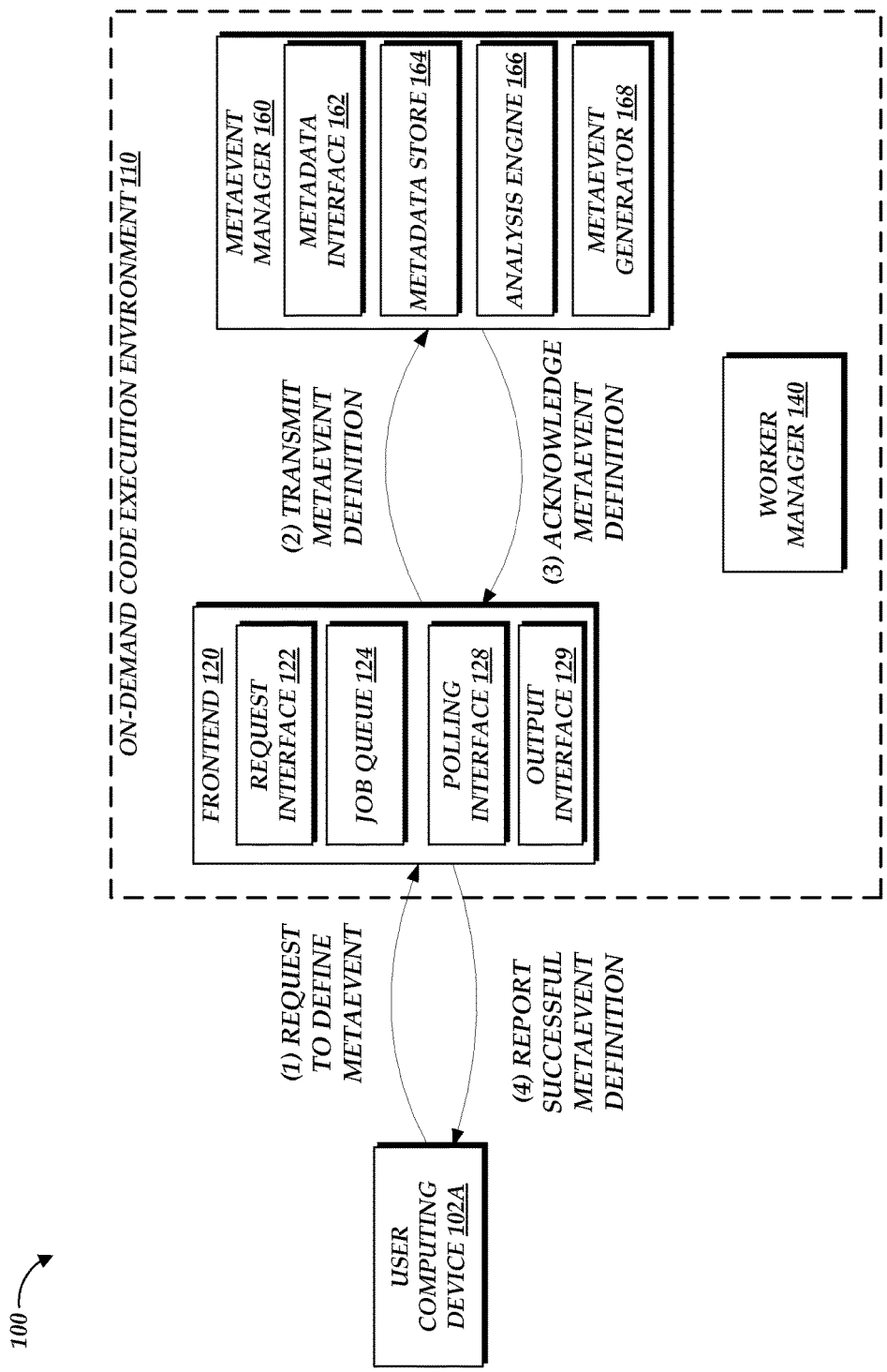
FIG. 3 is a flow diagram depicting illustrative interactions for defining a metaevent within the on-demand code execution environment of FIG. 1, which may cause execution of user-defined code based on metadata regarding execution of the on-demand code execution environment.

With reference to FIG. 3, illustrative interactions are depicted for the definition, by a user, of a metaevent by a user computing device 102A. Specifically, the interactions of FIG. 3 can enable a user computing device 102 associated with an account on the on-demand code execution environment 110 to define a set of criteria for a metaevent, based at least partly on metadata gathered by the on-demand code execution environment 110, and to further define a job to be created on satisfaction of the metaevent criteria. As will be described below with reference to FIGS. 4A-5, the on-demand code execution environment 110 may thereafter monitor operation of the on-demand code execution environment 110 to determine whether the metaevent criteria is satisfied, and on such satisfaction, generate the job corresponding to the metaevent. Because jobs may correspond to any set of user-defined code executable on the on-demand code execution environment 110, the interactions of FIG. 3 enable a user computing device 102 to monitor and control nearly any aspect of operation of the on-demand code execution environment 110.

The interactions of FIG. 3 begin at (1), where the user computing device 102A submits a request to the on-demand code execution environment 110 (e.g., to the frontend 120) to define a metaevent. The request may be submitted, for example, via a GUI, CLI, or API. The request may specify one or more criteria used to trigger the metaevent, any of which may correspond to metadata gathered by the on-demand code execution environment 110. By way of non-limiting example, criteria for a metaevent may specify that the metaevent should occur: when an event does not occur within a threshold period of time (which may reoccur, e.g., continuously), when metadata related to the occurrence, queuing, or processing of a job satisfies a threshold value (e.g., when the job has been queued for over a threshold period, when the job takes over a threshold period of time to complete execution, etc.), when the output of a job results in one or more specified values (e.g., errors, negative results, etc.), or when other events related to operation of the on-demand code execution environment 110 occur (e.g., when polling of an event source 108 fails or indicates an upcoming expiry of event data, when metadata indicates that the on-demand code execution environment 110 is modifying software executed by virtual machine instances, etc.). In addition to metaevent criteria, the request may also specify one or more jobs to create on satisfaction of the metaevent criteria (e.g., on occurrence of the metaevent). Each job may indicate a portion of user-defined code to be executed by virtual machines of the on-demand code execution environment 110, and may further indicate input values to be passed to that code. For example, each job may indicate a specific function, as well as parameters (if any) to be passed to the function. Such parameters may be obtained, for example, based on metadata of the on-demand code execution environment 110 (including both the metadata causing the metaevent and other metadata) or based on other information available to the on-demand code execution environment 110, such as a current time, current status of the user's account, current status of the on-demand code execution environment 110, etc.

On receiving the request, the frontend 120 may verify the request's legitimacy (e.g., by authenticating the user computing device 102 and verifying the metaevent request is properly formed), and thereafter transmit, at (2), the metaevent definition, such as the metaevent criteria and corresponding jobs, to the metaevent manager 160. The metaevent manager may therefore store the metaevent definition, e.g., within a data store of the analysis engine 166. As will be described below, the metaevent manager 160 can thereafter monitor for metadata that indicate satisfaction of the metaevent's criteria, and in the instance that such criteria is satisfied, create the jobs specified in the request. The metaevent manager can further transmit an acknowledgement of the definition of the metaevent to the frontend 120, at (3). In turn, the frontend 120, at (4), can report successful definition of the metaevent to the user computing device 102A.

Figure 4A:
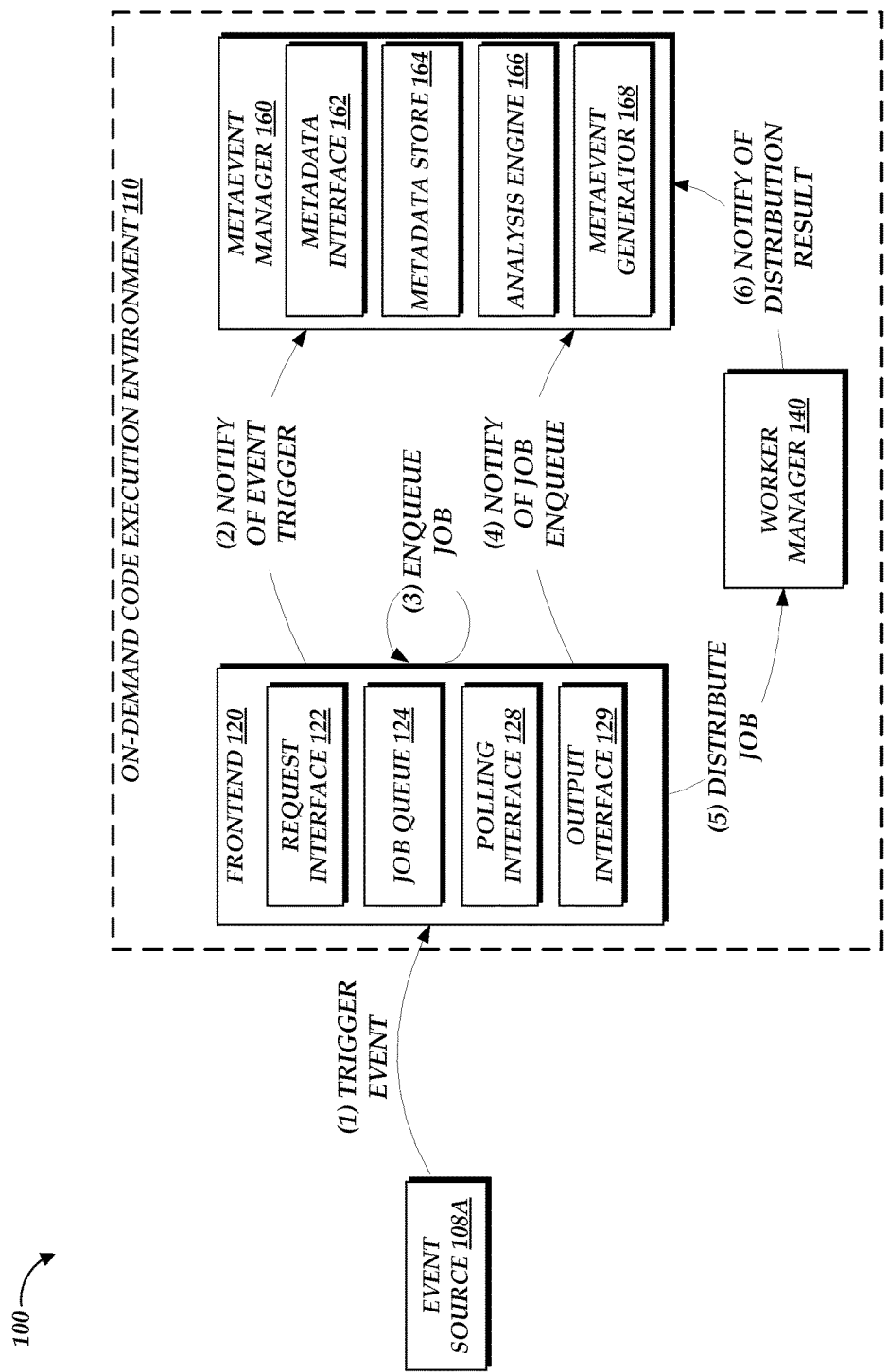
FIGS. 4A and 4B are flow diagrams depicting illustrative interactions for generating metadata within the on-demand code execution environment of FIG. 1 and reporting that metadata to a metaevent manager.
Figure 4B:
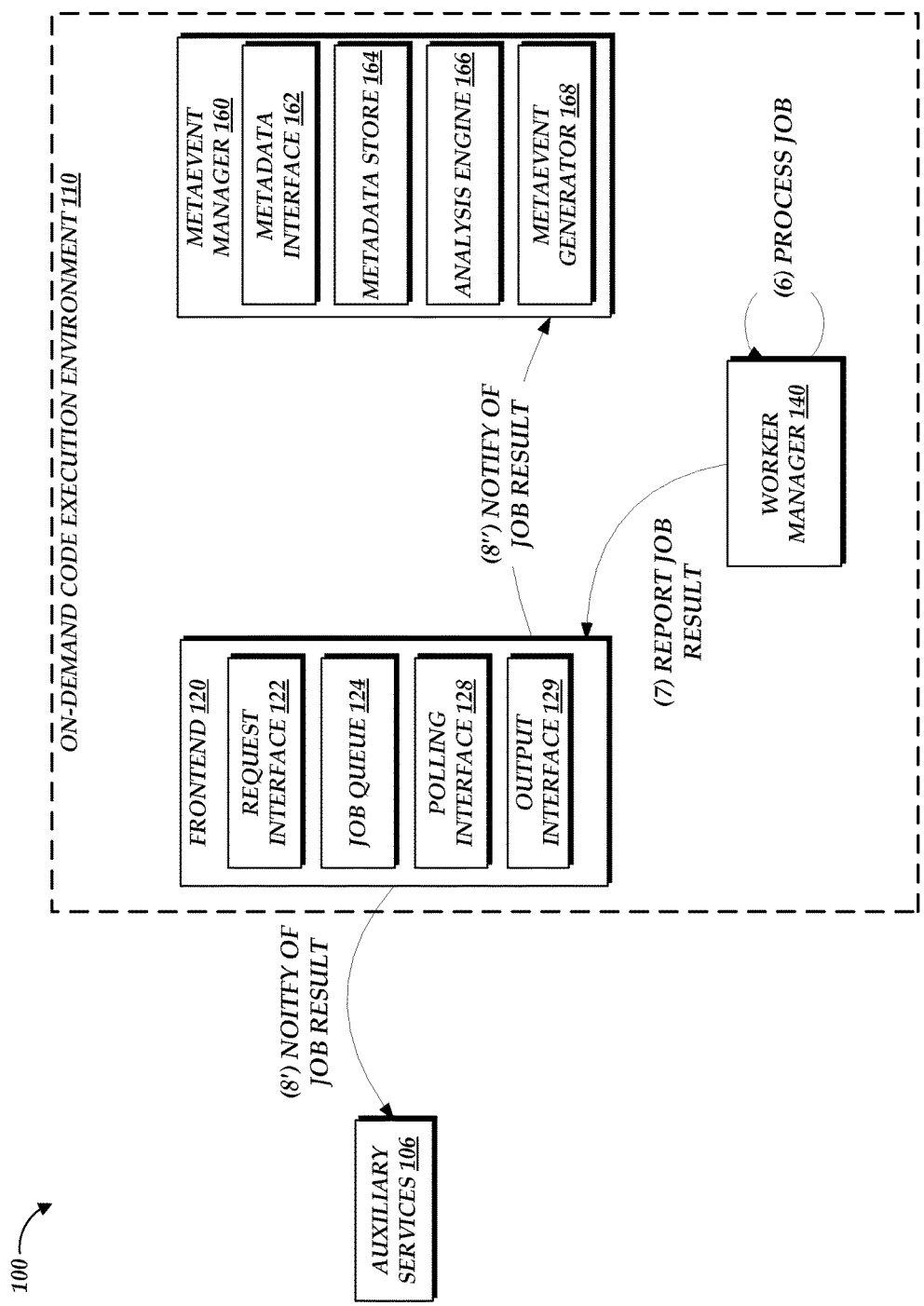

With reference to FIGS. 4A and 4B, illustrative interactions will be described regarding the collection of metadata at the on-demand code execution environment 110, which may be utilized to determine whether a metaevent has occurred (e.g., whether criteria corresponding to the metaevent has been satisfied). The interactions of FIG. 4A begin at (1), where an event source 108A triggers an event on the on-demand code execution environment 110 via transmission of information to the frontend 120. In one embodiment, interaction (1) may include transmission of an API call from the event source 108A to the frontend 120. In another embodiment, interaction (1) may include transmission of data to the frontend 120 (e.g., in response to a request for the data initiated by the polling interface 128) that indicates that an event should occur (e.g., the posting of a new message to a social networking service, the uploading of a file, etc.).

Thereafter, at (2), the frontend 120 transmits a notification of the trigger event to the metaevent manager 160. The notification may include any metadata related to the trigger event, including but not limited to the time at which the trigger event occurred, the identity of the event source 108A, or details of the trigger event (e.g., content of API call, post to social network, new file uploaded, etc.). The metaevent manager 160 may store the received metadata, including metadata indicating that the event trigger has occurred, within the metadata store 164.

In instances where the on-demand code execution environment 110 implements a queue for a job corresponding to the trigger event, the frontend 120 can place the job in the job queue 124 at (3). The frontend 120 can further notify the metaevent manager 160 of the enqueuing of the job at (4), including any details related to the enqueuing (e.g., a time placed in queue, a reason for enqueuing, an expected time of dequeuing, etc.). The metaevent manager 160 may store the received metadata, including metadata indicating that the job has been enqueued, within the metadata store 164. In instances where the on-demand code execution environment 110 does not implement a queue for the job corresponding to the trigger event, interactions (3) and (4) may be omitted.

When the frontend 120 determines that the job corresponding to the trigger event should be processed (e.g., when user-defined code associated with the trigger event should be executed on the on-demand code execution environment 110), the frontend 120 can distribute the job to the worker manager 140 for processing, at (5). Further details of implementation of jobs are provided within the '648 application, incorporated by reference above (e.g., at FIG. 4 of the '648 application, where jobs may also be referred to generally as "user code execution). On receiving the distributed job, the worker manager 140 can, at (6), notify the metaevent manager 160 of a result of the distribution. Illustratively, distribution may result in an indication that the job has been assigned for processing by a virtual machine instance, details of the virtual machine instance assigned to process the job (e.g., a configuration of the virtual machine, a virtual machine identifier, etc.), an indication that the distribution of the job failed or was delayed (e.g., due to insufficient resources available to the worker manager 140), or a result of distribution failure or delay (e.g., a return of the job to the frontend 120 for redistribution). In some instances, the worker manager 140 may additionally or alternatively be configured to notify the frontend 120 of a distribution result, which may in turn notify the metaevent manager 160.

The illustrative interactions described above continue with reference to FIG. 4B, where the worker manager 140, at (6) processes the job in accordance with the preferences of the user corresponding to the job (e.g., by executing code provided or defined by the user). Execution of user-defined code is described in greater detail within the '648 application, incorporated by reference above (e.g., at FIG. 4 of the '648 application). The worker manager 140 thereafter notifies the frontend 120 of the results of the job, at (7), which may include details regarding how user-defined code corresponding to the job was executed by the worker manager 140, output of the user-defined code, timing of the job on the worker manager 140 (e.g., total time required to process the job) or other metadata regarding processing of the job on the worker manager 140.

Thereafter, the frontend 120 may transmit a notification of the result of the job to the auxiliary service 106 (e.g., to a billing or logging function within the auxiliary services), at (8'). The frontend 120 may further transmit a notification of the job's result to the metaevent manager 160, at (8"). The notification may include any details received from the worker manager 140, as well as other information regarding the processed job available to the frontend 120, such as a status of account quotas associated with a user corresponding to the job or service-level-agreement (SLA) data resulting from processing of the job. The metaevent manager can thereafter store the received metadata in the metadata store 164.

With reference to FIG. 5, illustrative interactions for creating a metaevent based on metadata gathered at the on-demand code execution environment 110 will be described. The interactions of FIG. 5 may occur, for example, subsequent to the interactions described above with reference to FIGS. 3-4B, and may be based on metaevent criteria established by a user computing device 102 as well as metadata related to the processing of jobs corresponding to user-defined trigger events. The interactions of FIG. 5 may additionally or alternatively be based on other metadata than described above with respect to FIGS. 4A and 4B, such as metadata provided by an administrator of the on-demand code execution environment 110 (e.g., reflecting a status or change in configuration of the on-demand code execution environment 110) or metadata provided by an event source 108 or auxiliary services 106.

The interactions of FIG. 5 begin at (1), where the metaevent manager 160 analyzes metadata within the metadata store 164 to determine whether metaevent criteria (e.g., as established by a user) has been satisfied. In one embodiment, the analysis occurs at fixed intervals (e.g., every 10 seconds), where the interval is selected according to either or both of a frequency at which the user requests that metaevents should occur or computing resources available to the metaevent manager 160 for the analysis of metadata. In another embodiment, analysis may occur continuously, with specific metaevent criteria analyzed during each subdivision of a fixed time interval. For example, analysis of 10% of user's metaevent criteria may occur every one minute, such that all metaevent criteria is analyzed every ten minutes. In yet another embodiment, the analysis occurs in real-time or substantially real time, as new metadata is received at the metaevent manager 160. For example, the metaevent manager 160 may implement a queue of metadata received at the metaevent manager, and analyze each newly received item of metadata against corresponding metaevent criteria (e.g., all metaevent criteria, metaevent criteria referencing a class or type of the received metadata, etc.) to determine whether the newly received metadata, alone or in conjunction with metadata within the metadata store 164, satisfies any metaevent criteria. Still further, in some embodiments the metaevent manager may conduct analysis according to a combination of the above-described timings, such that a first set of metaevent criteria (e.g., of a prioritized class) is analyzed with respect to each newly received item of metadata, while a second set of metaevent criteria (e.g., of a non-prioritized class) is analyzed at fixed time intervals. In some instances, metaevent manager 160 may utilize parallel processing techniques to ensure that each analysis occurs at or substantially at the desired time. Still further, in some instance, the metaevent manager 160 may conduct an analysis of metadata by use of virtual machines within the on-demand code execution environment 110 itself. For example, while not shown in FIG. 5, the metaevent manager 160 may initiate an event on the on-demand code execution environment 110 that triggers execution of job that, when processed by the on-demand code execution environment 110 (e.g., via virtual machine 156 or virtual machine 158), causes the metadata within the metadata store 164 to be analyzed according to the received metaevent definitions, in order to determine the occurrence of one or more metaevents. At (2), the metaevent manager 160 determines that criteria of a metaevent have been satisfied by the obtained metadata. Illustratively, the metaevent manager 160 may determine that a user-specified event has not occurred within a defined time period, or that a job corresponding to an event was processed in over a threshold period of time (e.g., 100 ms). The metaevent manager 160 can therefore cause a metaevent to be triggered according to the specifications of a user associated with the metaevent criteria. Specifically, at (3), the metaevent manager 160 can generate (e.g., via the metaevent generator 168) a metaevent for transmission to the frontend 120. Illustratively, the metaevent may correspond to an API call or other data indicating that the metaevent should occur, and providing any other information required to execute the metaevent, such as function parameters, which may be extracted or derived from metadata within the metadata store 164.

At (4), the metaevent manager 160 transmits a trigger for the metaevent (e.g., a generated API call) to the frontend 120 for processing. The frontend 120, in turn, may enqueue the metaevent for handling by the on-demand code execution environment 110, at (5). The on-demand code execution environment 110 can thereafter handle the metaevent in the same way as other events, such as by creating a job corresponding to the event, and processing the job by executing user-specified code corresponding to the event. Because such execution may itself result in metadata, the interactions of FIGS. 3-5 may continue, potentially indefinitely, during operation of the on-demand code execution environment 110.

Figure 6:
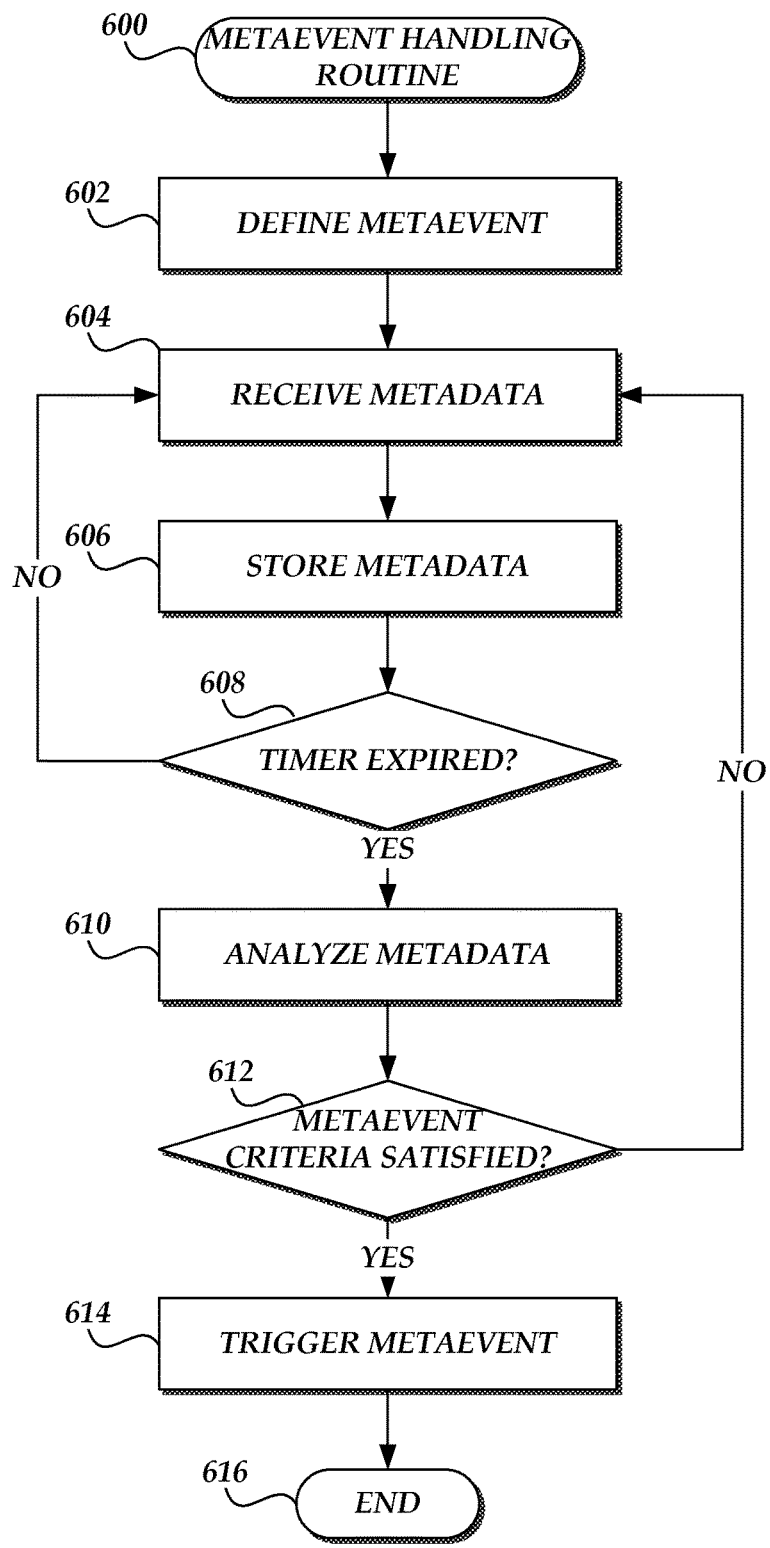
FIG. 6 flow chart depicting an illustrative routine for creating and triggering metaevents within the on-demand code execution environment of FIG. 1 based on metadata regarding execution of the on-demand code execution environment.

With reference to FIG. 6, a block diagram depicting an illustrative routine 600 for handling metaevents on an on-demand code execution environment 110 will be described. The routine 600 may be implemented, for example, by the metaevent manager 160 of FIG. 1, alone or in conjunction with other components of the on-demand code execution environment 110.

The routine 600 begins at block 602, where the metaevent manager 160 creates a metaevent. Creation of a metaevent may include, for example, a recording of criteria corresponding to the metaevent within a datastore of the metaevent manager 160, as well as a recording of actions to be taken on occurrence of the metaevent, such as execution of user-specified code on the on-demand code execution environment 110. In one embodiment, creation of a metaevent may occur in response to a request transmitted by a user to definition the metaevent.

The routine 600 can then continue to block 604, where the metaevent manager 160 receives metadata regarding the operation of the on-demand code execution environment 110, including but not limited to metadata regarding events detected at the on-demand code execution environment 110 (e.g., API calls, events triggered by polling of event sources 108, etc.), metadata regarding queuing or handling of those events at the on-demand code execution environment 110, metadata regarding handling or processing of jobs corresponding to the events, metadata regarding results of such jobs, and metadata regarding the status of the on-demand code execution environment 110. At block 606, the received metadata is stored within a metadata store.

At block 608, the metaevent manager 160 can determine whether a specified amount of time has passed, such that the received and stored metadata should be analyzed against the metaevent's criteria. In one embodiment, the amount of time may be specified by an administrator of the on-demand code execution environment 110. In another embodiment, the amount of time may be specified at least in part by the metaevent criteria. Illustratively, detection of whether the specified amount of time has passed may occur based on a timer within the on-demand code execution environment 110 (e.g., based on a reference time keeping device). Further, detection of whether specified amount of time has passed may occur based on one or more events detected at the on-demand code execution environment 110 (e.g., an event generated at each interval of a defined period of intervals), which may be established by the on-demand code execution environment 110 itself, or by various users of the on-demand code execution environment 110. If the amount of time has not passed, the routine 600 returns to block 604, where metadata continues to be received and stored at the metaevent manager 160.

If the amount of time has passed, the routine 600 continues to block 610, where the metadata from the metadata store is read and analyzed against the metaevent criteria. Illustratively, the metaevent manager 160 may determine one or more types of metadata specified within the metaevent criteria (e.g., associated with specific accounts, specific events, etc.), and analyze corresponding types of metadata within a metadata store to determine whether the criteria has been satisfied. At block 612, if the metaevent's criteria are not satisfied, the routine 600 returns to block 604, where the metaevent manager 160 continues to collect metadata. If the metaevent's criteria is satisfied, the routine 600 proceeds to block 614, where the metaevent manager 160 triggers a metaevent corresponding to the criteria, such as by generating and sending an API call to the frontend 120 to cause execution of user-specified code corresponding to the metaevent. The routine 600 then ends at block 616.

The routine 600 may be altered based on the requirements of the on-demand code execution environment 110. For example, while the routine 600 is described as reading and analyzing data at fixed time intervals, the routine 600 may be modified to operate on relative time intervals, to analyze received metadata in real time (e.g., by omitting blocks 606 and 608), or to analyze metadata in response to events detected at the on-demand code execution environment 110 (e.g., generated by external event sources 108 or by the on-demand code execution environment 110 itself). Moreover, in some embodiments of the present disclosure various functionalities described with respect to the routine 600 may be implemented in parallel, or as separate routines. For example, block 602 may be implemented as a first routine (e.g., in connection with a user request to define a metaevent, blocks 604 and 606 may be implemented as a second routine (e.g., running continuously to receive metadata), and blocks 610 through 614 may be implemented as a third routine implemented at fixed time intervals to analyze the metadata gathered by the second routine. Division of the routine 600 into multiple parallel routines may advantageously increase the speed of various functionalities of the routine 600, for example, where the on-demand code execution environment 110 utilizes parallel processing techniques. In some embodiments, one or more of the blocks of FIG. 6 may be omitted from the routine 600. For example, the routine 600 may be implemented based on prestablished metaevent definitions, and thus block 602 may be omitted. In other embodiments, one or more portions of the routine 600 may be carried out by other systems or devices, including systems or devices external to the on-demand code execution environment, which provide information to the metaevent manager 160. For example, blocks 600-604 may be implemented (collectively or individually) by one or more external systems, while blocks 610-614 are implemented by the metaevent manager 160 or other component of the on-demand code execution environment. As noted above, the routine 600 (or any portion of routine 600, which may illustratively be implemented as a stand-alone routine) may in some instances be executed in whole or in part by virtual machines within the on-demand code execution environment 110. For example, the metaevent manager 160 may implement block 610 of the routine 600 by generating an event on the on-demand code execution environment 110, which causes processing on the on-demand code execution environment 110 of specific computer-executable code that analysis received metadata to determine the occurrence of metaevents. As a further example, the entirety of the routine 600 may be implemented within virtual machines of the on-demand code execution environment 110. Utilization of virtual machines within the on-demand code execution environment 110 to implement the devices or functionalities described herein may beneficial reduce the need to maintain distinct computing resources within the on-demand code execution environment 110.

All of the methods and processes described above may be embodied in, and fully automated via, software code modules executed by one or more general purpose computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method for handling metaevents within an on-demand code execution environment, the on-demand code execution environment comprising at least one virtual machine instance executing an initialized operating system and awaiting requests to execute user-specified code within that operating system, the method comprising:
   as implemented by one or more computing devices configured with specific computer-executable instructions,
      receiving a request to define a metaevent on the on-demand code execution environment, wherein the metaevent is defined at least partly by satisfaction of a set of metaevent criteria relating to execution of a first set of user-specified code on the on-demand code execution environment, wherein the request specifies the set of metaevent criteria and a job to be executed by the on-demand code execution environment on occurrence of the metaevent by satisfaction of the metaevent criteria, and wherein the job includes execution of a second set of user-specified code, wherein satisfaction of the metaevent criteria requires that execution of the first set of user-specified code has not occurred within a specified time interval on the on-demand code execution environment;
      obtaining metadata regarding execution of the first set of user-specified code on the on-demand code execution environment, wherein the metadata regarding the operation of the on-demand code execution environment comprises at least one of: an indication of execution of the first set of user-specified code detected at the on-demand code execution environment, information regarding queuing a request to execute the first set of user-specified code at the on-demand code execution environment, information regarding timing of execution of the first set of user-specified code, information regarding throttling of execution the first set of user-specified code, or information regarding results or output of execution first set of user-specified code;
      analyzing the metadata according to the metaevent criteria to determine that the metadata satisfies the metaevent criteria; and processing the job at least partly by executing the second set of user-specified code within the initialized operating system of the at least one virtual machine instance.

2. The computer-implemented method of claim 1 further comprising:
receiving a request to define a second metaevent on the on-demand code execution environment, wherein the request to define the second metaevent specifies a second set of metaevent criteria and a third set of user-specified code to be executed on satisfaction of the second metaevent criteria;
obtaining second metadata regarding execution of the second set of user-specified code;
analyzing the second metadata according to the second metaevent criteria to determine that the second metadata satisfies the second metaevent criteria; and
executing the third set of user-specified code within the initialized operating system of the at least one virtual machine instance.

3. The computer-implemented method of claim 1, wherein the at least one virtual machine instance includes a plurality of virtual machine instances, and wherein executing the second set of code user-specified code within the initialized operating system of the at least one virtual machine instance comprises:
identifying a virtual machine instance from the plurality of virtual machine instances, wherein the identified virtual machine instance contains a particular software component that is suitable to execute the first set of user-specified code;
creating, within the virtual machine instance, a container to execute the second set of user-specified code;
loading the particular software component and the second set of user-specified code into the container; and
initiating execution of the second set of user-specified code by the container.

4. The computer-implemented method of claim 1, wherein analyzing the metadata according to the metaevent criteria to determine that the metadata satisfies the metaevent criteria comprises periodically analyzing at least a portion the metadata at each interval of a plurality of time intervals.

5. The computer-implemented method of claim 1, wherein obtaining metadata regarding the execution of the first set of user-specified code on the on-demand code execution environment comprises obtaining metadata from a log file maintained by at least one of the on-demand code execution environment or a data logging service external to the on-demand code execution environment.

6. A system for handling metaevents of an on-demand code execution environment, the on-demand code execution environment comprising at least one virtual machine instance executing an initialized operating environment, the system comprising:
a computing device comprising a processor coupled to a memory, the memory including specific instructions to cause the computing system to:
obtain a metaevent definition, the definition specifying a set of metaevent criteria and a first set of user-specified code to be executed on satisfaction of the metaevent criteria, wherein the metaevent criteria is based at least in part on execution of a second set of user-specified code on the on-demand code execution environment, wherein satisfaction of the metaevent criteria requires that execution of the second set of user-specified code has not occurred within a specified time interval on the on-demand code execution environment;
obtain metadata regarding execution of the second set of user-specified code on the on-demand code execution environment, wherein the metadata regarding the execution of the second set of user-specified code on the on-demand code execution environment comprises at least one of: an indication of execution of the second set of user-specified code detected at the on-demand code execution environment, information regarding queuing a request to execute the second set of user-specified code at the on-demand code execution environment, information regarding timing of execution of the second set of user-specified code, information regarding throttling of execution the second set of user-specified code, or information regarding results or output of execution second set of user-specified code;
analyze the metadata according to the metaevent criteria to determine that the metadata satisfies the metaevent criteria; and
execute the first set of user-specified code within the initialized operating environment of the at least one virtual machine instance.

7. The system of claim 6, wherein the at least one virtual machine instance is maintained, prior to determining that the metadata satisfies the metaevent criteria, in an pre-initialized state, and wherein the pre-initialized state enables the at least one virtual machine instance to execute the first set of user-specified code without requiring an operating system to be loaded on the at least one virtual machine instance subsequent to determining that the metadata satisfies the metaevent criteria.

8. The system of claim 6 further comprising a data store including a distributed memory cache, wherein the specific instructions further cause the computing device to store the received metadata within the distributed memory cache.

9. The system of claim 8, wherein the specific instructions cause the computing device to analyze the metadata based at least in part on retrieving the metadata from the distributed memory cache at each interval of a set of defined intervals.

10. The system of claim 9, wherein the set of defined intervals are determined based at least in part on an account associated with the metaevent criteria.

11. The system of claim 6, wherein the metadata includes information regarding data retrieved by the on-demand code execution environment from a data source external to on-demand code execution environment.

12. The system of claim 6, wherein the metadata indicates a change in configuration of the at least one virtual machine instance.

13. The system of claim 6, wherein the specific instructions further cause the computing system to:
obtain a second metaevent definition, wherein the second definition specifies a second set of metaevent criteria and a third set of user-specified code to be executed on satisfaction of the second metaevent criteria;
obtain second metadata regarding execution of the first set of user-specified code;
analyze the second metadata according to the second metaevent criteria to determine that the second metadata satisfies the second metaevent criteria; and
execute the third set of user-specified code within the initialized operating environment of the at least one virtual machine instance.

14. Non-transitory, computer-readable storage media comprising computer-executable instructions for handling metaevents of an on-demand code execution environment, the on-demand code execution environment comprising at least one initialized virtual machine instance, wherein the computer-executable instructions, when executed by a computer system, cause the computer system to:

obtain a metaevent definition, the definition specifying a set of metaevent criteria and a first set of user-specified code to be executed on satisfaction of the metaevent criteria, wherein the metaevent criteria is based at least in part on execution of a second set of user-specified code on the on-demand code execution environment, wherein satisfaction of the metaevent criteria requires that execution of the second set of user-specified code has not occurred within a specified time interval on the on-demand code execution environment;

obtain metadata regarding execution of a second set of user-specified code on the on-demand code execution environment, wherein the metadata regarding the execution of the second set of user-specified code on the on-demand code execution environment comprises at least one of: an indication of execution of the second set of user-specified code detected at the on-demand code execution environment, information regarding queuing a request to execute the second set of user-specified code at the on-demand code execution environment, information regarding timing of execution of the second set of user-specified code, information regarding throttling of execution the second set of user-specified code, or information regarding results or output of execution second set of user-specified code;

analyze the metadata according to the metaevent criteria to determine that the metadata satisfies the metaevent criteria; and transmit instructions to the on-demand code execution environment to execute the first set of user-specified code on the at least one initialized virtual machine instance.

15. The non-transitory, computer-readable storage media of claim 14, wherein initialization of the at least one initialized virtual machine instance enables the at least one initialized virtual machine instance to execute the first set of user-specified code without requiring an operating system to be loaded on the at least one initialized virtual machine instance subsequent to determining that the metadata satisfies the metaevent criteria.

16. The non-transitory, computer-readable storage media of claim 14, wherein the computer-executable instructions cause the computer system to analyze the metadata in response to an event on the on-demand code execution environment.

17. The non-transitory, computer-readable storage media of claim 14, wherein the execution of the second set of user-specified code on the on-demand code execution environment is occurs in response to a request generated by at least one of the on-demand code execution environment or an event source external to the on-demand code execution environment.

18. The non-transitory, computer-readable storage media of claim 14, wherein set of the set of metaevent criteria is included within a third set of user-specified code, and wherein satisfaction of the metaevent criteria is determined based at least in part on execution of the third set of user-specified code.

* * * * *